(12) United States Patent
Mattikalli et al.

(10) Patent No.: US 8,686,854 B2
(45) Date of Patent: Apr. 1, 2014

(54) SYSTEM AND METHOD FOR FORMING OPTIMIZED PERIMETER SURVEILLANCE

(75) Inventors: Raju S. Mattikalli, Sammamish, WA (US); Robert W. Grube, Edmonds, WA (US); Paul Z. Thunemann, Snoqualmie, WA (US)

(73) Assignee: The Boeing Company, Chicago, IL (US)

(*) Notice: Subject to any disclaimer, the term of this patent is extended or adjusted under 35 U.S.C. 154(b) by 1386 days.

(21) Appl. No.: 12/412,754

(22) Filed: Mar. 27, 2009

(65) Prior Publication Data
US 2009/0244070 A1    Oct. 1, 2009

Related U.S. Application Data

(60) Provisional application No. 61/041,053, filed on Mar. 31, 2008.

(51) Int. Cl.
G08B 13/00    (2006.01)

(52) U.S. Cl.
USPC ........ 340/541; 340/506; 340/545.2; 340/565; 709/226; 703/1

(58) Field of Classification Search
USPC .............. 340/441, 541, 506, 545.2, 565, 551, 340/552; 702/2, 150; 703/1; 709/224–226
See application file for complete search history.

(56) References Cited

U.S. PATENT DOCUMENTS

| | | |
|---|---|---|
| 5,265,024 A | 11/1993 | Crabill et al. |
| 5,828,332 A | 10/1998 | Frederick |
| 6,177,945 B1 | 1/2001 | Pleyer |
| 6,199,015 B1 | 3/2001 | Curtwright et al. |
| 6,227,491 B1 | 5/2001 | Stephan et al. |
| 6,336,072 B1 | 1/2002 | Takayama et al. |
| 6,384,840 B1 | 5/2002 | Frank et al. |
| 6,501,392 B2 | 12/2002 | Gremmert |
| 6,653,947 B2 | 11/2003 | Dwyer et al. |
| 6,694,486 B2 | 2/2004 | Frank et al. |
| 6,771,932 B2 | 8/2004 | Caminiti |

(Continued)

FOREIGN PATENT DOCUMENTS

| | | |
|---|---|---|
| EP | 0926652 | 6/1999 |
| WO | WO 98/10311 | 3/1998 |
| WO | WO 03/032622 | 4/2003 |

OTHER PUBLICATIONS

European Search Report: Date of completion of the search: Nov. 7, 2009: Application No. EP 07 01 3928.

(Continued)

Primary Examiner — Hoi Lau
(74) Attorney, Agent, or Firm — Harness, Dickey & Pierce, P.L.C.

(57) ABSTRACT

A software module apparatus for enabling a user to generate a virtual tripwire through a geographic area of interest using a plurality of sensors. The apparatus may make use of an input for allowing a user to input a digital elevation model (DEM) of the area of interest. An input responsive to a user controlled device may also be used for defining a swath of the area of interest, the swath representing a subregion laying over, or adjacent to, a border to be monitored. A display may be generated for illustrating computed locations of a plurality of independent sensors used to form the virtual tripwire through the swath of the area of interest.

21 Claims, 19 Drawing Sheets

(56) References Cited

U.S. PATENT DOCUMENTS

| | | | |
|---|---|---|---|
| 6,786,453 | B2 | 9/2004 | Jones |
| 6,889,938 | B1 | 5/2005 | Nordman |
| 6,890,077 | B2 | 5/2005 | Dunn |
| 6,950,021 | B2 | 9/2005 | Butler |
| 7,019,757 | B2 | 3/2006 | Brown et al. |
| 7,027,040 | B2 | 4/2006 | Rekimoto et al. |
| 7,028,950 | B2 | 4/2006 | Salmon et al. |
| 7,046,254 | B2 | 5/2006 | Brown et al. |
| 7,176,937 | B2 | 2/2007 | Gannon |
| 7,300,693 | B2 | 11/2007 | Albers et al. |
| 7,415,352 | B2 | 8/2008 | Olcott |
| 2002/0149599 | A1 | 10/2002 | Dwyer et al. |
| 2004/0223056 | A1 | 11/2004 | Norris, Jr. |
| 2005/0051255 | A1 | 3/2005 | Nordman |
| 2005/0288831 | A1 | 12/2005 | Lusardi et al. |
| 2006/0024483 | A1 | 2/2006 | Koch et al. |
| 2006/0033617 | A1 | 2/2006 | Wakefield |
| 2006/0071125 | A1 | 4/2006 | Wood et al. |
| 2006/0071127 | A1 | 4/2006 | Wood et al. |
| 2006/0080914 | A1 | 4/2006 | Wood et al. |
| 2006/0253570 | A1* | 11/2006 | Biswas et al. ............ 709/224 |
| 2006/0284016 | A1 | 12/2006 | Balsillie et al. |
| 2007/0034743 | A1 | 2/2007 | Albers et al. |
| 2007/0069080 | A1 | 3/2007 | Rassaian et al. |
| 2007/0192068 | A1* | 8/2007 | Shay et al. ............ 703/1 |
| 2007/0265781 | A1 | 11/2007 | Nemethy et al. |
| 2008/0022217 | A1 | 1/2008 | Aspen |
| 2008/0074259 | A1 | 3/2008 | Houston |
| 2008/0078877 | A1 | 4/2008 | Switzer et al. |
| 2010/0106420 | A1* | 4/2010 | Mattikalli et al. ............ 702/2 |

OTHER PUBLICATIONS

Chiang, Mung; Low, Steven H.; Calderbank, A. Robert; and Doyle, John C. "Layering As Optimization Decomposition: Questions and Answers", IEEE Xplore, Downloaded on Apr. 13, 2009 at 16:36 from IEEE Xplore.,10 pages.

Mattikalli, Raju; Fresnedo, Roman, Frank, Paul; Locke, Summer, and Thunemann, Zack. "Optimal Sensor Selection and Placement for Perimeter Defense", May 18, 2007, 8 pages.

Bose, Prosenjit; Shermer, Thomas; Toussaint, Godfried, and Zhu, Binhai. "Guarding Polyhedral Terrains", Computational Geometry 7 (1997) pp. 173-185.

Rajagopalan, Sridhar and Vazirani, Vijay. "Primal-Dual RNC Approximation Algorithms for Set Cover and Covering Integer Programs", Siam J. Comput, vol. 28, No. 2, 1998 Society for Industrial and Applied Mathematics, pp. 525-540.

De Floriani, Leila; Magillo, Paola; and Puppo, Enrico. "Applications of Computational Geometry to Geographic Information Systems", Dipartimento di Informatica e Scienze dell'Informazione—Universita di Genova, believed to be prior to Mar. 27, 2009, pp. 1-53.

Franklin, William Randolph. "Siting Observers on Terrain", Rensselaer Polytechnic Institute, Troy, New York, Mar. 18, 2002, pp. 1-11.

Franklin, William Randolph and Vogt, Christian. "Multiple Observer Siting on Terrain With Intervisibility or Lo-Res Data", Rensselaer Polytechnic Institute, Troy, New York, May 11, 2004, pp. 1-6.

Yilmaz, Ayse S.; McQuay, Brian N.; Wu, Annie S.; and Sciortino, Jr., John C. "Designing Teams of Unattended Ground Sensors Using Genetic Algorithms", School of Electrical Engineering and Computer Science, University of Central Florida, Orlando, FL and Naval Research Laboratory, Washington, DC, believed to be prior to Mar. 27, 2009, 10 pages.

Tracy, D. M.; Franklin, W. R.; Luk, F. T. "Multiple Observer Siting on a Compressed Terrain", Rensselaer Polytechnic Institute, believed to be prior to Mar. 27, 2009, 2 pages.

Franklin, W. Randolph and Vogt, Christian. "Tradeoffs When Multiple Observer Siting on Large Terrain Cells", Rensselaer Polytechnic Institute, Troy, New York, believed to be prior to Mar. 27, 2009, pp. 1-15.

Caldwell, D. R.; Mineter, M.J.; Dowers, S.; and Gittings, B.M. "Analysis and Visualization of Visibility Surfaces", U.S. Army Engineer Research and Development Center, Topographic Engineering Center, Alexandria, VA and Geography, School of GeoSciences, University of Edinburgh, Edinburgh, Scotland, believed to be prior to Mar. 27, 2009,11 pages.

Tsai, Y.-H.R.; Cheng, L.-T; Osher, S.; Burchard, P.; and Sapiro, G. "Visibility and Its Dynamics in a PDE Based Implicit Framework", Jounral of Computational Physics 199 (2004) 33 pages.

\* cited by examiner

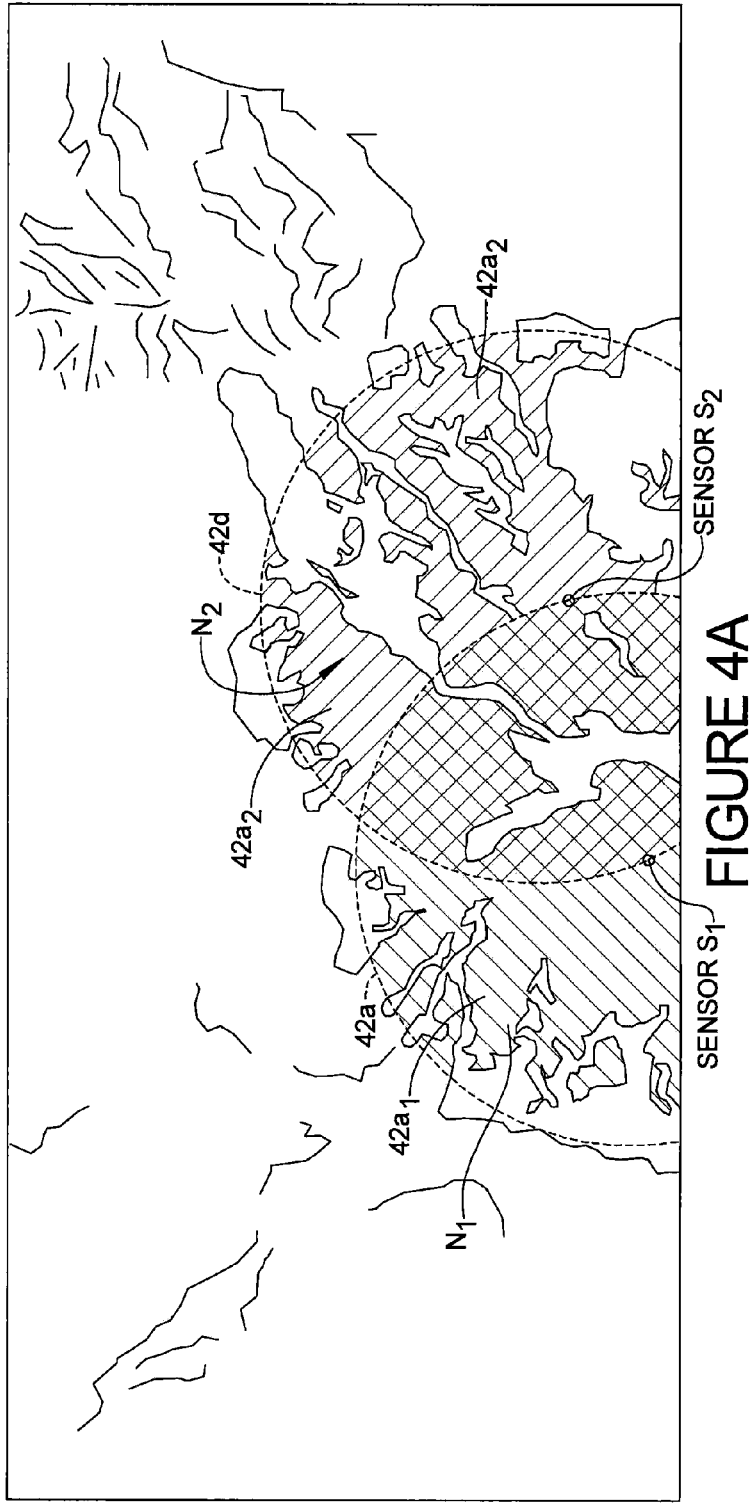

ALTERNATIVELY YOU COULD MASK IN AREAS THAT ARE ALLOWED

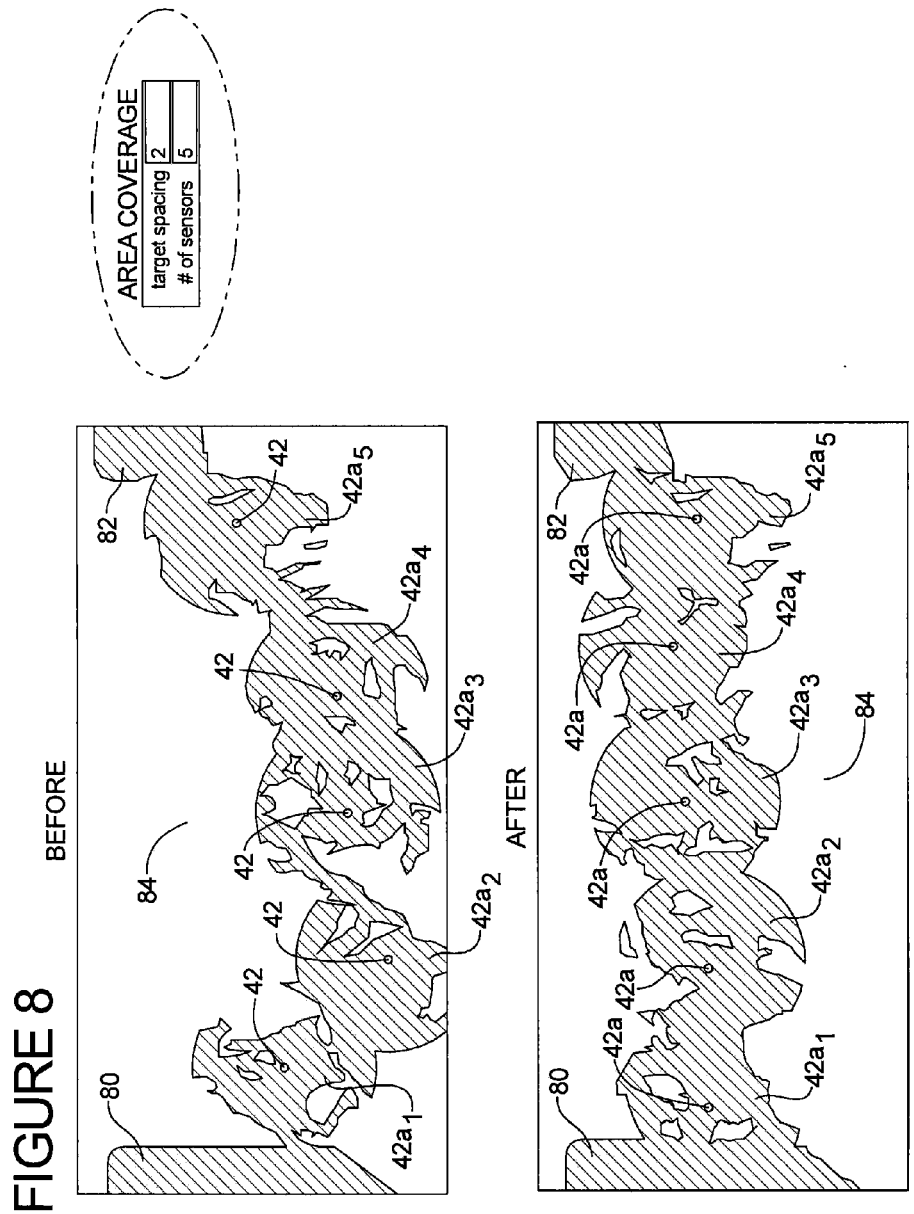

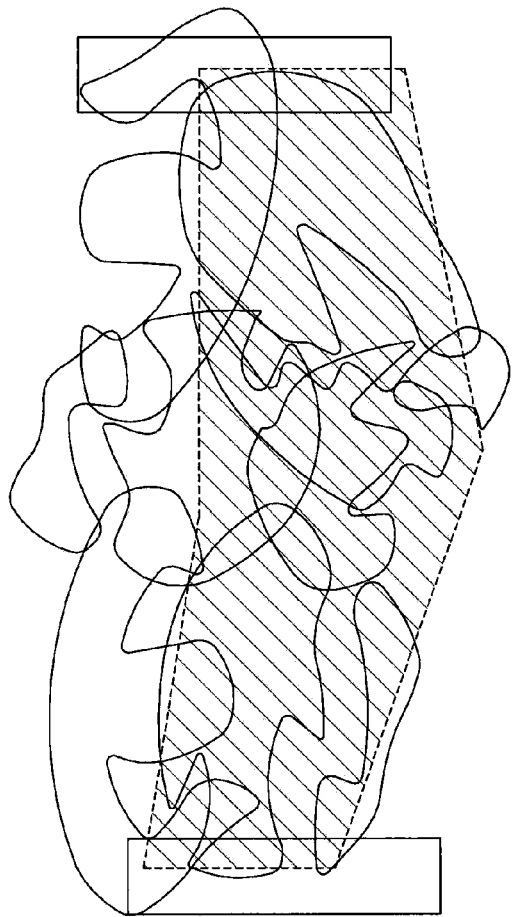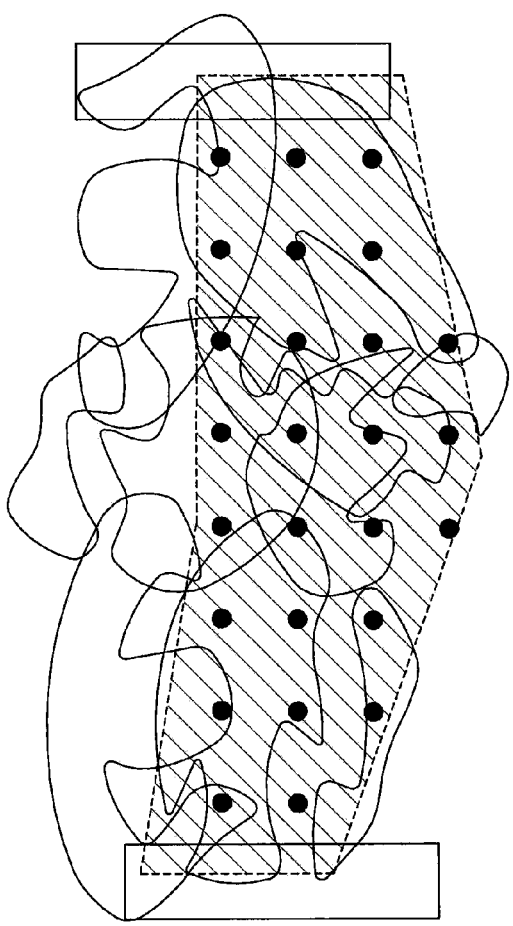
STEP 1: DEFINE SWATH
FIGURE 8A
STEP 2: SELECT GRID-RESOLUTION TO OBTAIN POINTS OVER WHICH AREA WILL BE MAXIMIZED
FIGURE 8B

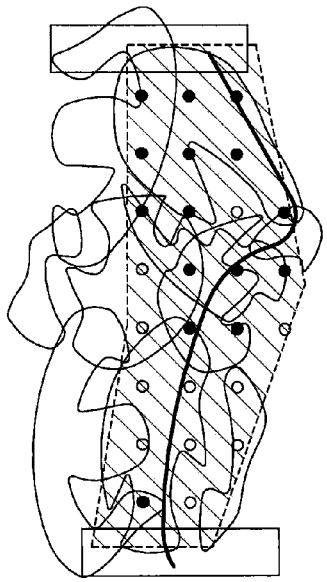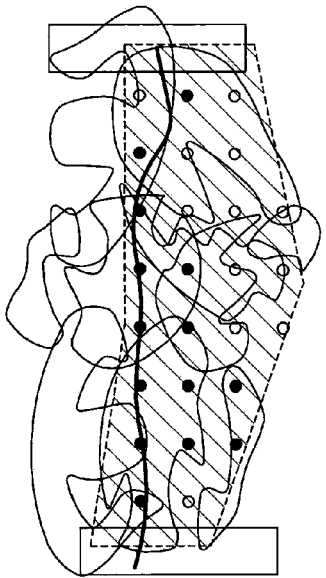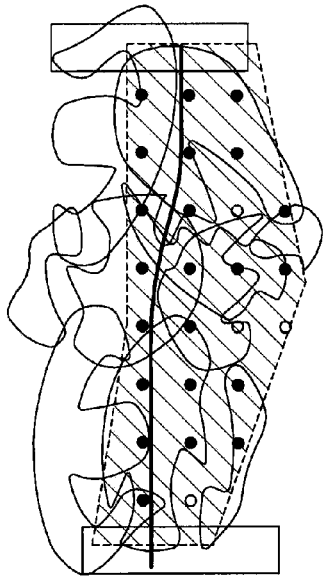
FIGURE 8C
CASE a:
COVERS 21 OF 26 POSTS
(SOLID CIRCLES
INDICATE POSTS
COVERED)
FIGURE 8D
CASE B:
COVERS 14 OF 26 POSTS
(SOLID CIRCLES
INDICATE POSTS
COVERED)
FIGURE 8E
CASE B:
COVERS 22 OF 26 POSTS
(SOLID CIRCLES
INDICATE POSTS
COVERED)

STEP 1: COMPUTE WEDGES

STEP 2: CONSTRUCT
WEDGES ADJACENCY GRAPH

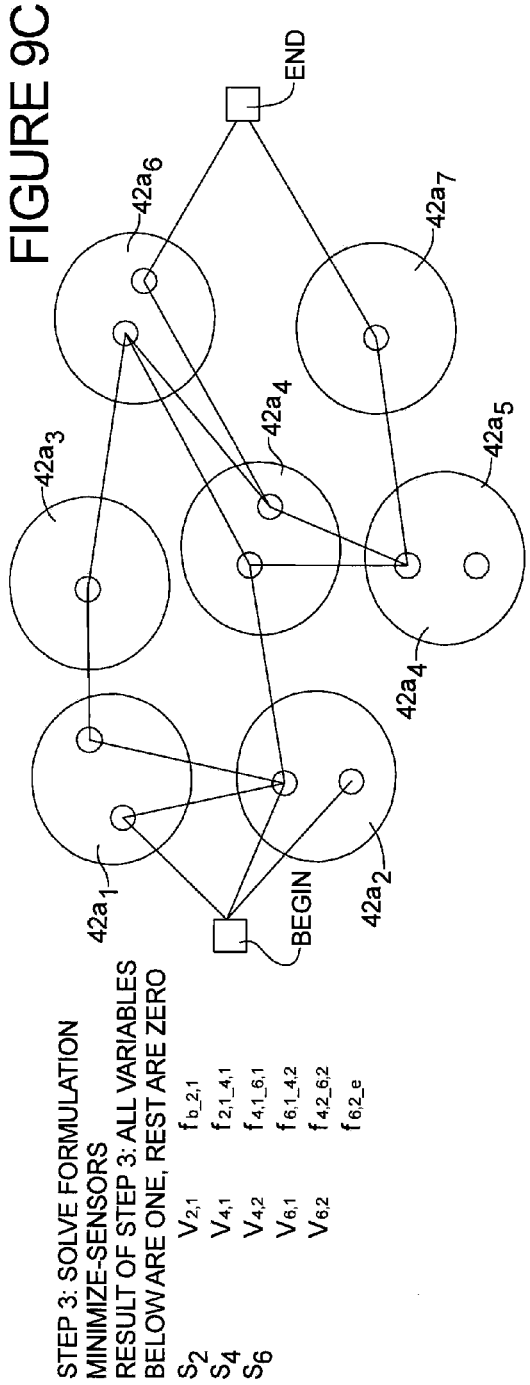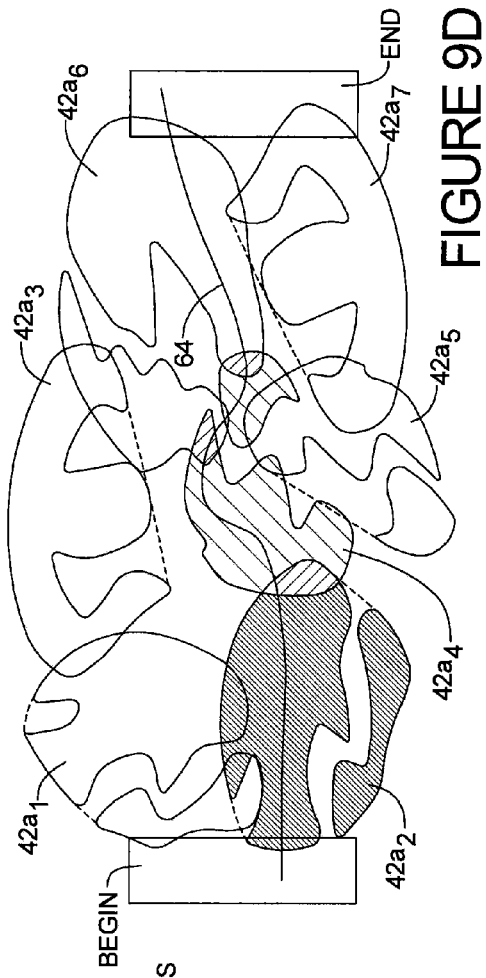

SYSTEM AND METHOD FOR FORMING OPTIMIZED PERIMETER SURVEILLANCE

CROSS-REFERENCE TO RELATED APPLICATIONS

This application claims the benefit of U.S. Provisional Application No. 61/041,053, filed Mar. 31, 2008. The present application is also related in general subject matter to pending U.S. patent application Ser. No. 12/412,800, filed Apr. 29, 2010 (now U.S. Pat. No. 8,370,111) The disclosures of each of the above applications are incorporated herein by reference into the present application.

FIELD

The present disclosure relates to surveillance systems in general, and more particularly to a surveillance or detection system that employs a plurality of sensors or devices to perform surveillance or detection operations along a predetermined boundary line or area.

BACKGROUND

The statements in this section merely provide background information related to the present disclosure and may not constitute prior art.

Surveillance of geographic borders, as well as of large, fixed terrestrial based facilities such as buildings, military bases and manufacturing facilities has been growing in importance. At the present time there is particularly strong interest in performing surveillance of the borders of the United States, and even more particularly the U.S. border with Mexico. However, the U.S./Mexico border stretches more than 2000 miles, and thus real time surveillance poses significant cost and implementation challenges.

The precise locations chosen for the sensors that are to be used for monitoring purposes are typically chosen by engineering judgment using a specific perimeter line that is to be monitored. Typically the perimeter line closely, or in some instances identically, tracks the geographic border line. To fully cover a large geographic perimeter boundary such as the U.S./Mexican border with sensors such as radars and cameras placed at spaced apart points along the border would require an inordinately large number of such devices. Covering the entire U.S./Mexico border may require thousands, or even tens of thousands of such sensors or devices. Such an implementation quickly becomes economically infeasible, not to mention the significant challenges that are encountered with the on-going maintenance of thousands or more of sensors or cameras. Complicating this further is that a geographic border line, the U.S./Mexico border line being just one example, often runs over deep ravines, steep hills and dense forests. Thus, the complex border topography makes such a border difficult, if not impossible, to cover with a reasonable, limited number of sensors.

In various parts of the world, the border between neighboring countries also often runs through a mountainous region. Mountainous regions impose significant challenges when trying to lay out a plurality of sensors. This is due to the complex topography of such regions. Typically, previously developed surveillance systems employed in mountainous regions have required large numbers of sensors, many of which end up covering very small sections of the border area being monitored. In some instances this has made border protection through a mountainous region economically infeasible.

SUMMARY

In one aspect the present disclosure relates to a software module apparatus for enabling a user to generate a virtual tripwire through a geographic area of interest using a plurality of sensors. The apparatus may make use of an input for allowing a user to input a digital elevation model (DEM) of the area of interest. An input responsive to a user controlled device may also be used for defining a swath of the area of interest, the swath representing a subregion laying over, or adjacent to, a border to be monitored. A display may be generated for illustrating computed locations of a plurality of independent sensors used to form the virtual tripwire through the swath of the area of interest.

In another aspect the present disclosure relates to a software module apparatus for enabling a user to generate a virtual tripwire through a geographic area of interest using a plurality of sensors to detect the presence of an object or individual that crosses the virtual tripwire. The software module may have an input for allowing a user to input a digital elevation model (DEM) of the area of interest. Another input may be provided for enabling the user to define a plurality of candidate sensors that represents a maximum number of sensors that may be used to form the virtual tripwire. A display may be generated for illustrating the virtual tripwire. The display may display computed locations of at least a subplurality of the candidate sensors used to form the virtual tripwire through the area of interest. The display may also display a viewshed of each one of the subplurality of the candidate sensors used to form the virtual tripwire, each viewshed representing a coverage region of its associated candidate sensor and selected adjacent ones of the viewsheds of different ones of the subplurality of the candidate sensors overlapping with one another. The display may also overlay the viewsheds on the DEM while displaying the virtual tripwire.

In another aspect the present disclosure relates to a software module apparatus for enabling a user to generate a virtual tripwire through a geographic area of interest using a plurality of sensors to detect the presence of an object or individual that crosses the virtual tripwire. The software module may comprise an input for allowing a user to input a digital elevation model (DEM) of the area of interest. A computing subsystem may be used for determining a minimum number of sensors, and a location of each one of the minimum number of sensors on the DEM required to form the virtual tripwire. The software module may also implement a display adapted to use information generated by the computing subsystem for illustrating the virtual tripwire as an overlay on the DEM.

Other areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4A is an illustration of the wedges that are formed within each of a pair of adjacent, overlapping viewsheds, and how nodes are assigned to each wedge;

FIG. 4B is an illustration of an adjacency graph constructed from the two nodes indicated in FIG. 4A;

FIG. 8 is an illustration of the area of interest and five viewsheds that partially overlap within the area of interest, illustrating how the sensors locations can be selected to provide overlapping viewsheds but still not be optimally located within the area of interest to provide area maximum coverage within the area of interest;

FIGS. 8A-8E set forth the specific operations in performing the Formulation Maximize-Area process;

FIG. 9 shows an optimized selection using the same number of sensors as used in FIG. 8, but with the selection of the sensors being optimized to maximize the area of coverage by the viewsheds of the selected sensors within the area of interest;

FIGS. 9A-9D illustrate an example of the Formulation Minimize-Sensors process for determining a virtual tripwire using a minimum number of sensors;

DETAILED DESCRIPTION

The following description is merely exemplary in nature and is not intended to limit the present disclosure, application, or uses.

Figure 1:
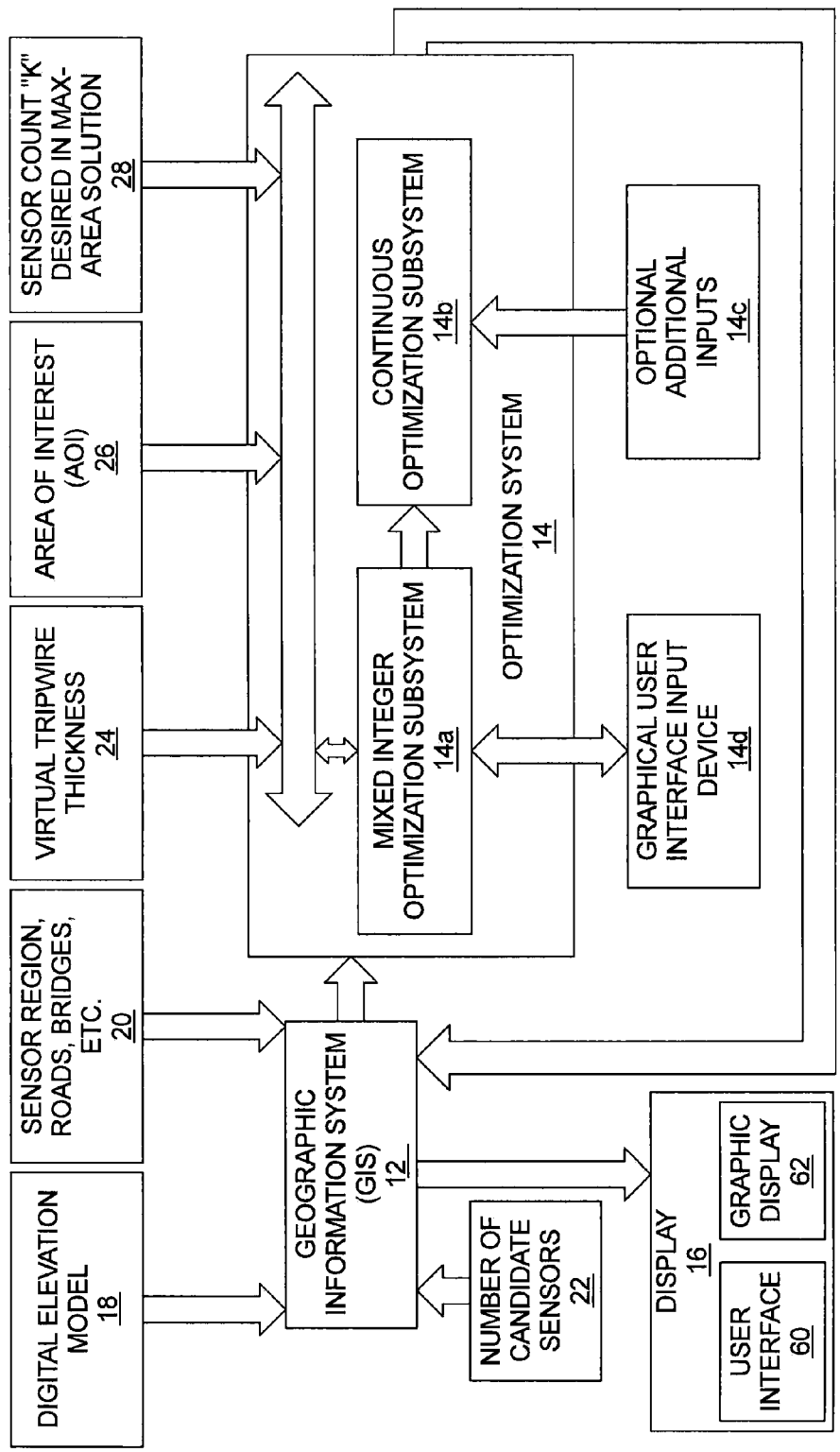
FIG. 1 is a block diagram of one embodiment of the system of the present disclosure.

Referring to FIG. 1, one embodiment of a system 10 for forming a virtual tripwire is shown. The system 10 may be used to analyze a geographic region and to determine an optimum number of independent sensors, for example radar devices or optical imaging devices such as cameras, to use to form the virtual tripwire. By "virtual tripwire", it is meant a continuous or near-continuous line across an area of interest within the geographic region. An individual, vehicle or object that crosses this line may then have a high probability of being detected, or possibly a one-hundred percent probability of being detected. In addition to optimizing the number of sensors, the shape of the virtual tripwire may itself be optimized in a manner that allows the virtual tripwire to be covered with a minimal set of sensors.

The system 10 may be implemented in a software program and may include a geographic information system (GIS) 12, an optimization system 14 and a display 16. One commercially available GIS software system suitable for use is available from ESRI of Redlands, Calif. The GIS 12 may receive as an input 18 a digital elevation model of a region of interest, for example a section of the border between the United States and Mexico. Alternatively, the digital elevation model may be of a region in which a military base is present. Still further the digital elevation model may be a model of a geographic region in which a manufacturing or other large scale facility is present. Such a region may comprise, for example, a region where an oil refinery is present, a region where a power plant is present, a region where large government or private buildings or complexes are present, a region in which an airport is located, a region where a water treatment facility is located, or any other facility, structure or region where perimeter monitoring and intrusion detection is desired. Various digital elevation models may be obtained from the U.S. Geological Survey for various geographic regions around the world. In addition to the digital elevation model (DEM) of the terrain, which typically represents a bare earth model, digital surface models (DSM) representing the tops of trees and buildings can also be used.

It will be appreciated that while the system 10 is ideally suited to cost effectively providing perimeter detection over large geographic areas spanning dozens, hundreds or even thousands of square miles, that the system 10 may just as readily be implemented on a smaller scale to provide perimeter monitoring and detection over geographic regions spanning just a few acres or kilometers. In both cases, geometric models of man made structures such as buildings and bridges could be included. As will become apparent from the following paragraphs, a significant benefit of the system 10 is its ability to determine the optimum number of independent sensors, and the specific locations of thereof, over complex geographic terrain involving ravines, mountains, streams, dense foliage, etc., and on structures such as buildings and bridges, while taking into account line-of-sight blockages from both natural and man made structures.

The GIS 12 may also receive one or more inputs 20 relating to the geographic coordinates (latitude and longitude) of known roads (if not already present on the digital elevation model being used), or even the coordinates of known structures such as bridges, dams, antenna towers, power line poles, water reservoir towers, billboards, etc. An optional input 22 may be provided to inform the GIS 12 of a certain, initial number of candidate sensors to consider when performing its analysis. The GIS 12 uses the digital elevation model, any inputs 20 provided to it, and, if provided, the number of candidate sensors to determine a sensor location for each sensor and a "viewshed" for each sensor. By "viewshed" of a given sensor, it is meant a subregion (on the digital elevation model or a geometric model) over which events can be detected by the sensor. This subregion may correspond to points possessing a line-of-sight to that given sensor. Alternatively it may correspond to a point computed using some other sensor performance model. Preferably, the initial number of candidate sensors selected by the user will be large enough so that at least a small degree of overlap of the viewsheds of adjacently located sensors occurs throughout the digital elevation map.

As an example, the present description will assume that 800 sensors have been selected as the initial number of candidate sensors. Thus, the locations of the candidate sensors are plotted by the GIS 12 so that they provide a pattern of viewsheds over the digital elevation model, with adjacent viewsheds sufficiently overlapping with one another to "blanket" the digital elevation model.

The optimization system 14 may include a mixed-integer optimization subsystem 14a and a continuous optimization subsystem 14b. The mixed integer optimization subsystem 14a may be provided with inputs for "Virtual Tripwire Thickness" 24, "Area of Interest (AOI)" input 26 and a "Sensor Count 'K' Desired For Max-Area Solution" input 28. The mixed-integer optimization subsystem 14a uses the sensor location and viewshed information generated by the GIS 12, as well as user input 26 defining a specific area of interest of the digital elevation model, the bounds of the virtual tripwire, and optionally the "thickness" of the virtual tripwire (from input 24), that is to be constructed, and may analyze the foregoing information to determine the positions of each one of a subset of the 800 candidate sensors that are required to form the virtual tripwire having the requested thickness, through the area of interest. The subset of sensor locations may then be input to the continuous optimization subsystem 14b, together with optional additional inputs 14c that the user may define, such as specific types of sensors that are to be used, or the maximum height that any sensor can be placed at. In this regard, it will be appreciated that the height that a sensor such as a radar device or optical imaging device is placed at can have a significant impact on the size (i.e., area) of its viewshed. For example, a camera placed at a height of five meters above ground level may have a viewshed that is only a small fraction of the viewshed that the same camera would have if mounted twenty meters above the ground surface.

The continuous optimization subsystem 14b maintains the sensor latitude, longitude locations as constant but reduces sensor range and sensor above ground level (AGL) height to further refine the sensor type and sensor positions generated by the mixed-integer optimization subsystem 14a. The sensor locations defined by the optimization system 14 may be such that gaps of predetermined distances are allowed along the virtual tripwire, depending on the input constraints provided by the user. Thus, if cost is a significant concern, then a non-continuous virtual tripwire can be constructed using a smaller number of sensors that still provides a high probability (e.g., 90%) of detection. If a 100% probability of detection is desired, then the construction of the virtual tripwire is optimized so that at least some small degree of overlap is present for the viewsheds of any two adjacently located sensors. The optimization system 14, in selecting the placement and number of sensors required to form the virtual tripwire, may essentially solve a combinatorial optimization problem by solving a linear mixed integer programming problem.

The thickness of the virtual tripwire can be further tailored using input 24 and the optimization system 14 such that a minimum thickness is provided, for example 1 Km, at any point along the virtual tripwire. In this instance, the optimization system 14 selects a sufficiently large number of sensors so that the viewsheds of the selected sensors have individually at least about a 1 Km virtual tripwire through themselves, but also pair-wise have sufficient overlap to provide the 1 Km thickness along the virtual tripwire. This aspect of the system 10 will also be further explained in the following paragraphs.

The information output from the continuous optimization subsystem 14b is input back into the GIS 12 which uses the locations of the selected sensors, their viewsheds and the shape of the virtual tripwire to create an overlay of the virtual tripwire on the area of interest of the digital elevation model. This information may then be displayed on a display system 16.

Figure 2:
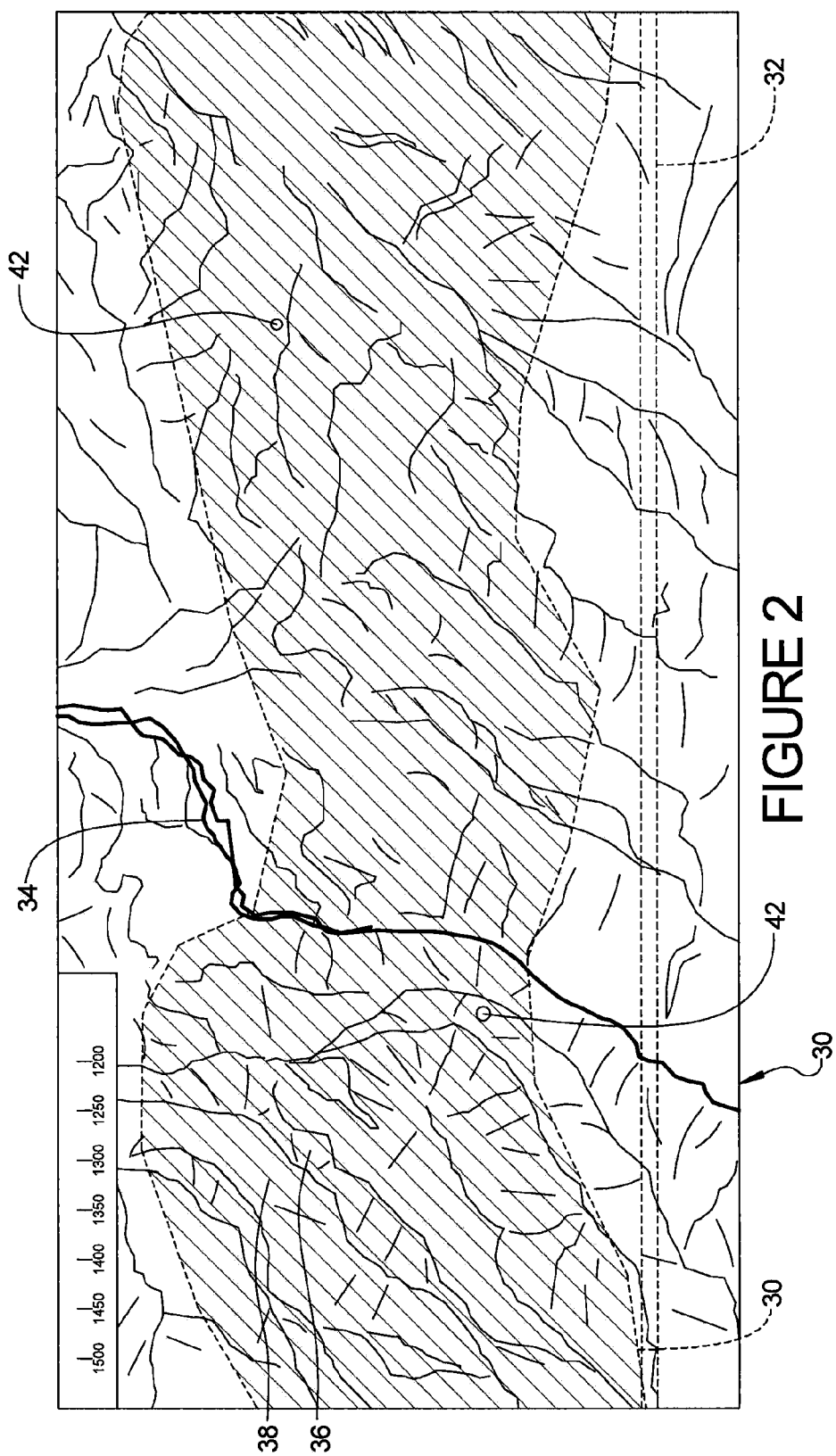
FIG. 2 is an exemplary digital elevation model showing a user designated area of interest that the user desires a virtual tripwire to extend through for the purpose of monitoring a border.

Referring now to FIGS. 2-9, various illustrations will be provided that further help to explain the creation of the virtual tripwire. FIG. 2 is an illustration of an exemplary geographic digital elevation model 30 with a border line 32 overlayed thereon. Various roads and/or rivers 34 meander throughout the illustrated region. Elevated areas 36 such as hills or mountainous areas are present, as well as below grade areas such as ravines 38. Cross hatched area 40 is a designated "area of interest" that has been selected by a user using a mouse or other computer instrument. This area of interest may form one of the inputs 20 that is applied to the mixed-integer optimization subsystem 14a. It will be noted that the area of interest 40 runs generally parallel to the border 32 in this example, but it will also be appreciated that the virtual tripwire that is constructed by the system 10 does not necessarily need to run generally parallel to the border. In fact, depending on the terrain within the area of interest, and the number of sensors being used, the virtual tripwire may deviate considerably from the border 32, depending on what the system 10 determines is the most efficient layout of sensors in constructing the virtual tripwire. In some instances a virtual tripwire that deviates from the border path might be constructed with a significantly fewer number of sensors than one that tracks closely parallel to the border, and the significant cost savings (with no loss of detectability) might be preferred over the more expensive solution that employs a greater number of sensors.

The topography of the selected area of interest will heavily influence the precise locations for the sensors. In certain areas, such as around ravines where line-of-sight may be very limited, more sensors may be required, while at elevated areas where no line-of-sight obstructions are present for some distance, then fewer sensors may be required because of the enhanced line-of-sight. The sensors in this example are indicated by reference number 42.

Figure 3:
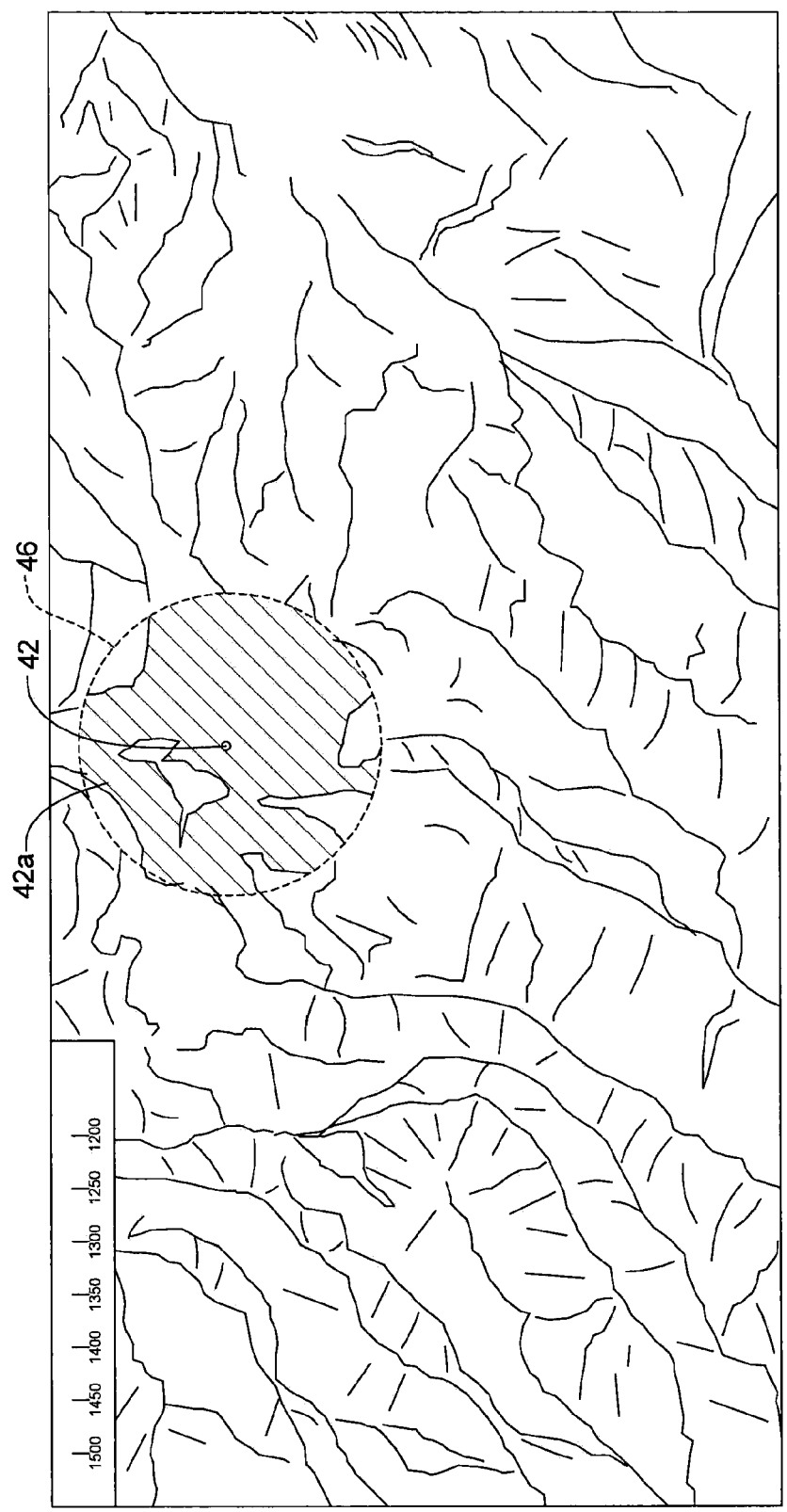
FIG. 3 is an enlarged view of one exemplary viewshed created by the system and illustrating its associated sensor at the approximate geometric center of the viewshed.
Figure 4:
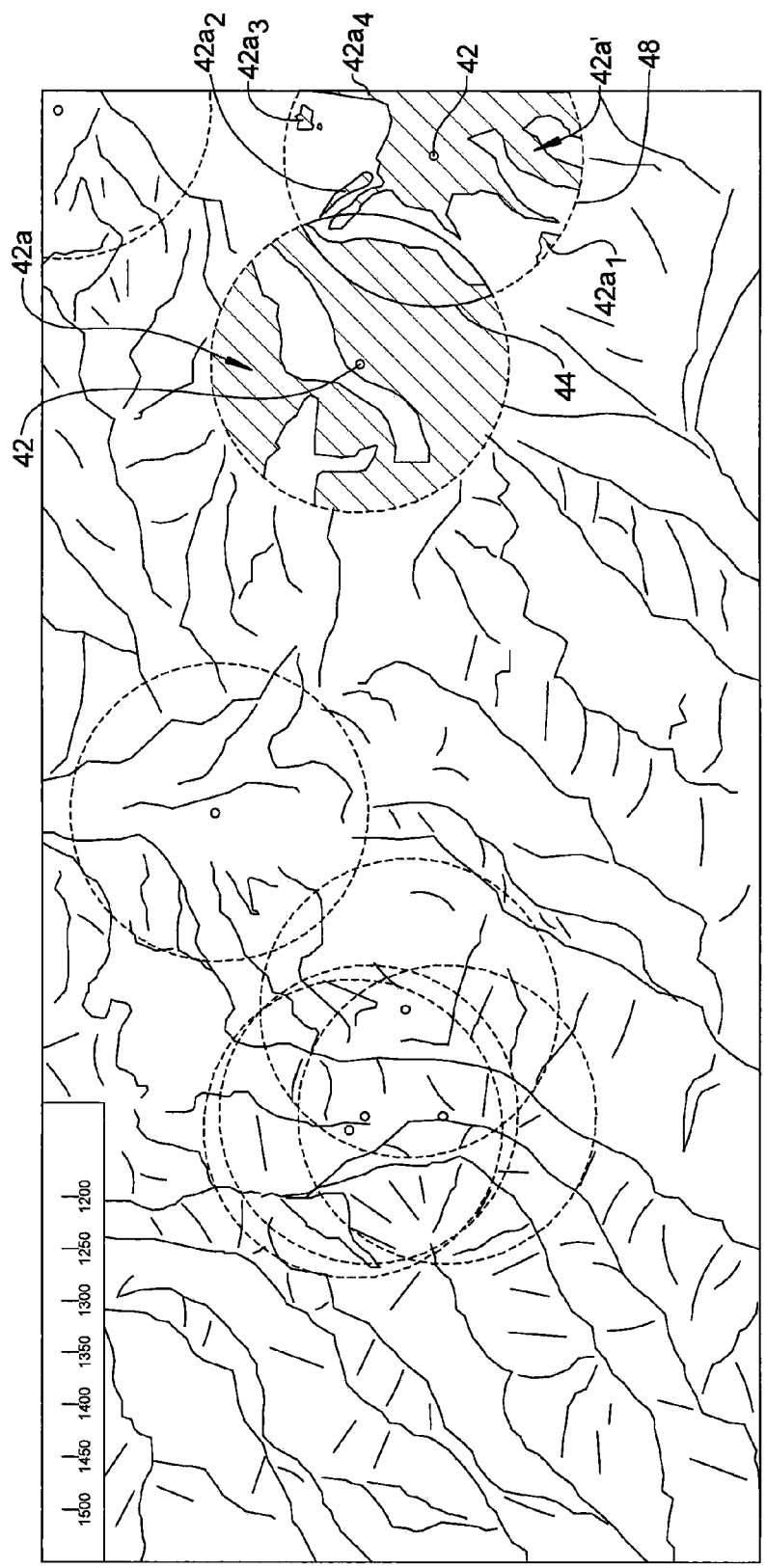
FIG. 4 shows the digital elevation model of FIG. 3 but with a plurality of viewsheds overlayed thereon, with the wedges of the viewsheds being designated.

Turning to FIG. 3, the viewshed 42a of one of the sensors 42 is shown. The general perimeter of the viewshed 42a is indicated in dashed lines, and in this example takes the general shape of a circle. The viewshed 42a may form one continuous or substantially continuous area, or it may form essentially a collection of island-like subregions called "wedges". An example of a viewshed 42a having a plurality of wedges is shown in FIG. 4, with the wedges being indicated by numbers $42a_1$, $42a_2$, $42a_3$ and $42a_4$. In the example of FIG. 4, two viewsheds 42a and 42a' can be seen overlapping at circled area 44. Each wedge of a given viewshed 42a represents a contiguous set of points that has a line-of-sight to its associated sensor 42, and is within a predetermined distance (e.g., 10 Km) of its associated sensor 42. As can be seen from FIGS. 3 and 4, the topography of the terrain significantly affects the formation of each viewshed 42a. Depending on the terrain and other obstructions (e.g., bridges, antenna towers, water storage towers, power line poles or structures, etc.), a viewshed 42a may take the form of a fully formed circle, a substantially formed circle, or an area that only loosely resembles a circle. In FIG. 3, the stippled portions within dashed line circle 46 represent those subregions of the viewshed 42*a* where a line-of-sight exists to the sensor 42, while the un-stippled portions represent areas where a line-of-sight does not exist to the sensor 42. Similarly in FIG. 4, the dashed line circle 48 and the stippling illustrate that there exists within the viewshed 42*a*' significant subregions where no line-of-sight to the sensor 42 is available.

The optimization system 14 analyzes each viewshed 42*a* and further constructs a graph, referred to as a "wedge adjacency" graph, wherein a node is assigned to each wedge of a given viewshed. This is illustrated in FIGS. 4A and 4B, with a portion of a corresponding wedge adjacency graph shown in FIG. 4B. In FIG. 4A the two viewsheds 42*a* and 42*a*' can be seen to have wedge 42$a_1$, which is labeled as node Node$_1$, and wedge 42$a_2$, which is labeled as node Node$_2$ in FIG. 4B. The wedges 42$a_1$ and 42$a_2$ overlap one another, with the stippled portion of the drawing representing the portion of overlap. Since the two wedges 42$a_1$ and 42$a_2$ overlap, the nodes Node$_1$ and Node$_2$ that are assigned to represent them in an adjacency graph are connected by a pair of directed arcs 43A and 43B as shown in the adjacency graph of FIG. 4B. Thus, it will be appreciated that in practice the adjacency graph may represent a large and highly complex graph when hundreds or thousands of overlapping viewsheds 42*a* are present, thus producing hundreds or thousands of interconnected nodes. The wedge adjacency graph will be used in mathematical computations to be described in the following paragraphs.

Figure 5:
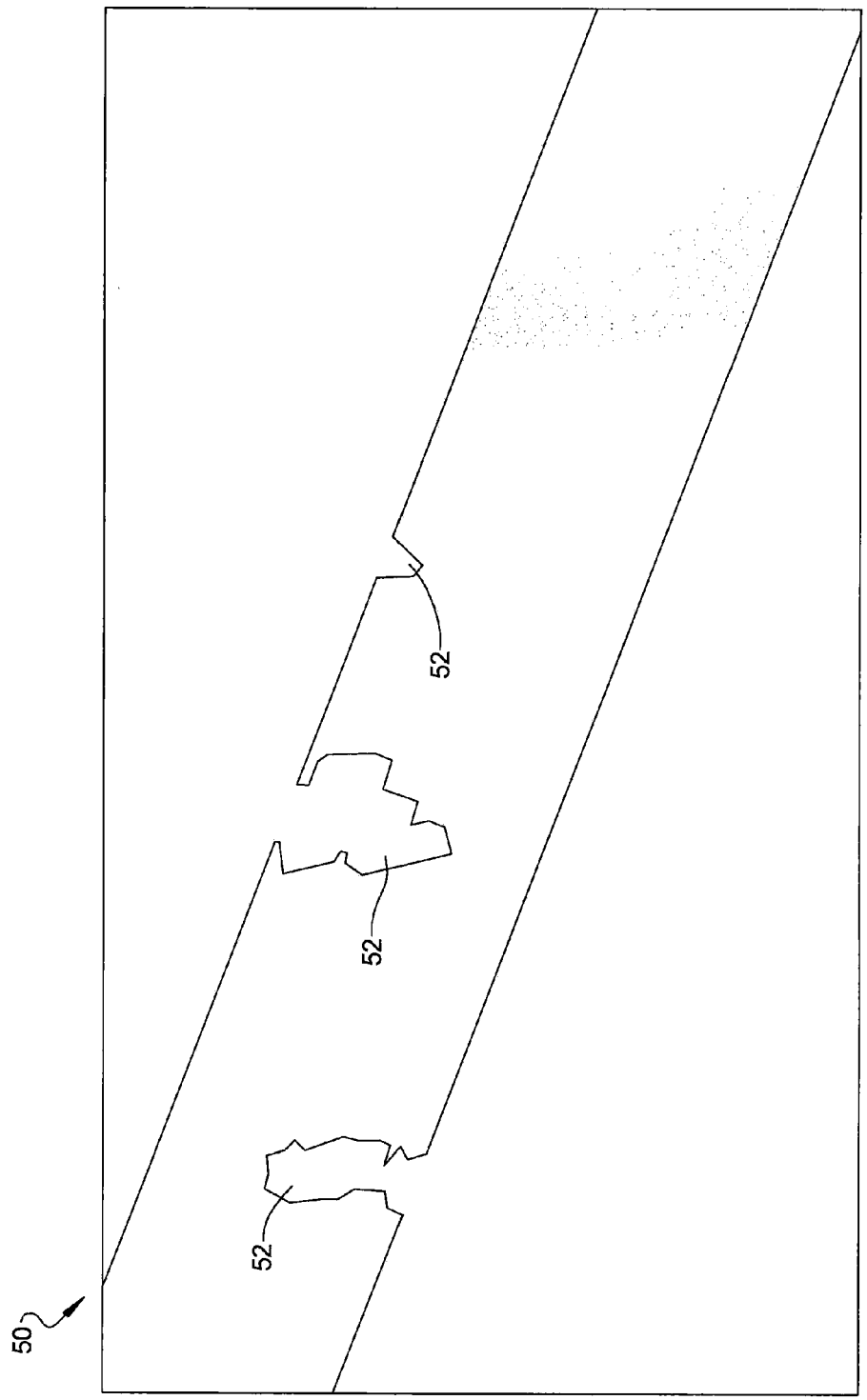
FIG. 5 shows a view of a portion of a digital elevation model illustrating a rectangular area of interest selected by a user, with specific portions within the area of interest blacked out, indicating that such portions will not be considered in determining the optimum layout of the sensors.

Referring to FIG. 5, in initially defining the area of interest, which is shown in this example as area 50, certain subregions within the area of interest may be eliminated from consideration. In this example these eliminated areas are designated by reference number 52. This may be accomplished via the mixed-integer optimization subsystem 14*a* through a suitable graphical user interface device 14*d* that makes use of a component, such as a mouse or graphics tablet. The user simply traces those areas within the region of interest 50 that are to be deleted from consideration, prior to the virtual tripwire being generated. The deletions may be made using the device 14*d* while the regions of interest 50 is being displayed on the display 16. Alternately, the user can generate these areas in a GIS system or graphical tool of choice and import their outlines.

Figure 6:
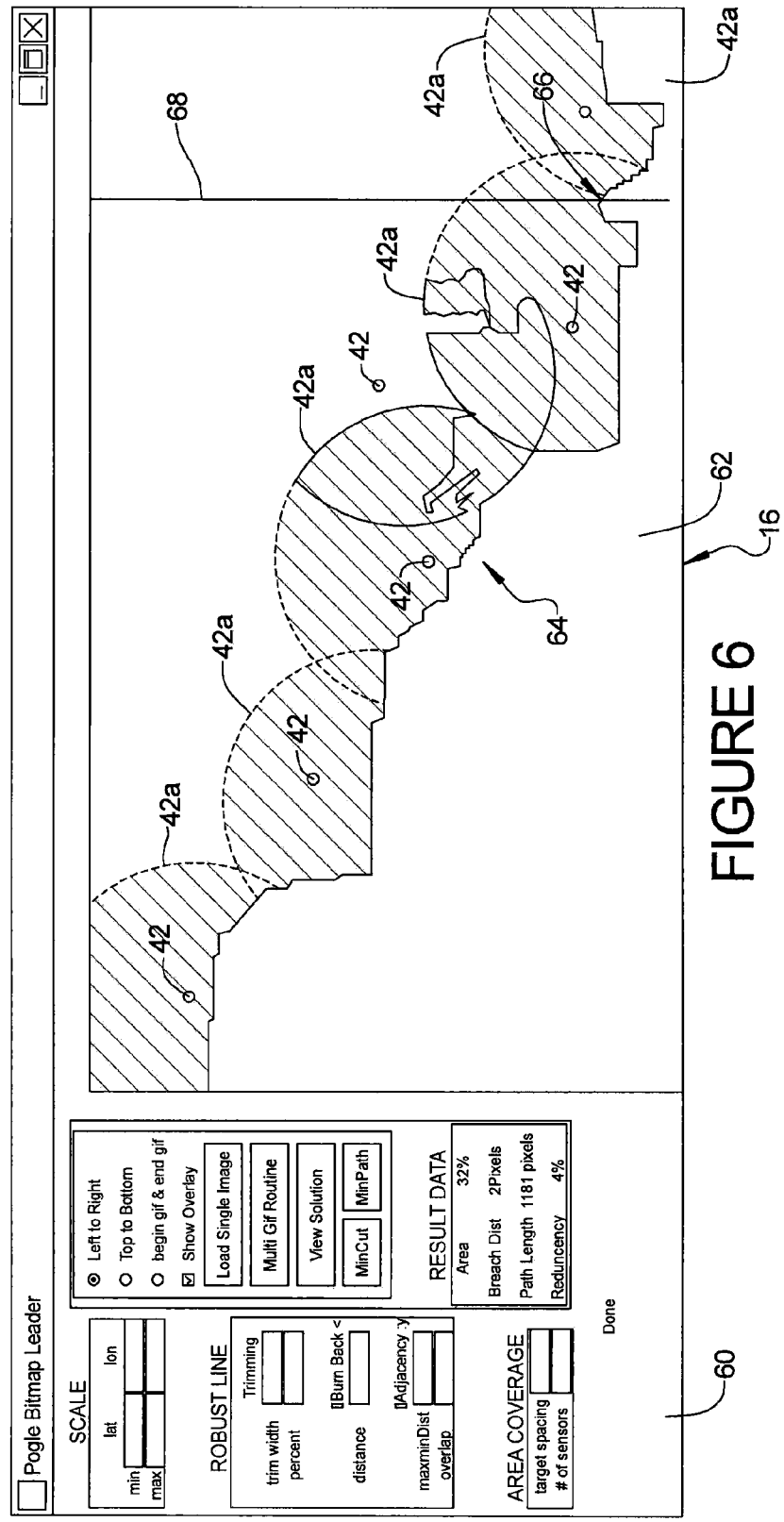
FIG. 6 is an illustration of a virtual tripwire made up of six sensors, and showing the viewsheds associated with the six sensors.

Referring to FIG. 6, a portion 62 of the display 16 displays the virtual tripwire and the viewsheds 42*a* associated with the selected sensors 42. It will be appreciated that the computer screen display may be displayed on the display 16. In this example the virtual tripwire is indicated by reference number 64, while the sensor locations are shown as small filled red boxes. The selection of the six specific sensors 42$_1$-42$_6$ in this example produces overlapping viewsheds 42*a* that enable a continuous, unbroken path to be formed by the virtual tripwire 64.

Figure 7:
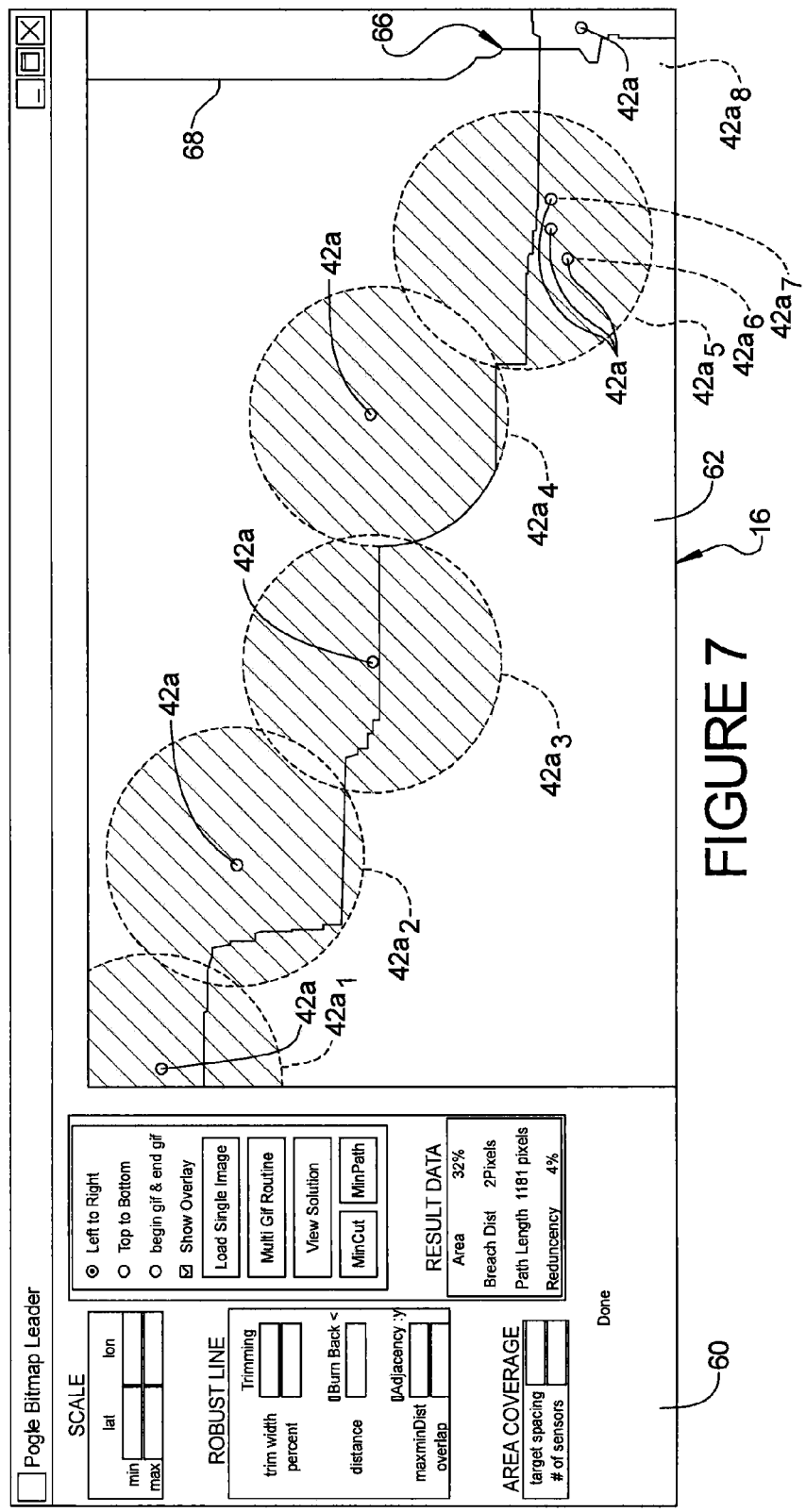
FIG. 7 is a view of a different virtual tripwire constructed from eight sensors and illustrating the increased thickness of the virtual tripwire at one specific point where an individual or vehicle might cross the tripwire.

In the example of FIG. 6, it will be noted that the virtual tripwire 64 has a relatively small "thickness" at point 66. By "thickness" it is meant that the geographic viewshed area around the virtual tripwire 64 at point 66 is very limited. Thus, an individual or vehicle crossing the virtual tripwire along path 68 will only be detected for a relatively short period of time (or over a very small area). To compensate for this, a "Trimming" field 70 in portion 60 of the display may be set to a desired number of display pixels, where a display pixel corresponds to a certain area defined by latitude and longitude, for example 1 Km in longitude by 1 Km in latitude. Thus, if the initial calculation of the virtual tripwire 64 was performed with a default pixel value of "1", that corresponds to one square kilometer, then the thickness of the constructed virtual tripwire will be at least 1 Km at all points along the virtual tripwire 64 (assuming no gaps are allowed). Thus, if the user inputs a value of "3" into the Trimming field 70, the optimization system 14 can re-calculate the selection of sensors 42 to select an additional number of required sensors and sensor locations to provide the desired level of virtual tripwire thickness. An example of this is shown in the illustration of FIG. 7 which shows an eight sensor solution for the same terrain as that in FIG. 6. The eight sensor locations produce eight corresponding viewsheds 42$a_1$-42$a_8$. It will be noted that viewsheds 42$a_6$ and 42$a_8$ overlap to produce a significantly greater thickness at crossing point 66. This provides a significantly greater area over which detection may take place, as well as a longer time duration during which detection may be take place.

Referring to FIGS. 8 and 9, it can be seen that the user has the ability to define a "start patch" 80 and an "end patch" 82 to define the bounds of the virtual tripwire being sought. FIGS. 8 and 9 also show that in order to solve a coverage area maximization problem, the user can also adjust the number of sensors selected to tailor the positions of the viewsheds 42*a* so that a greater percentage of the area of interest 84 is covered by the viewsheds 42*a*. This is accomplished using a Formulation Area-Maximization process which will be described momentarily. Thus, in FIG. 9, one can see that the five viewsheds 42*a* are more centrally located over the area of interest 84, and thus cover a much larger percentage of the area of interest. Referring briefly to FIGS. 8A-8F, the operations in performing the Formulation Maximize-Area process are set forth.

As mentioned hereinbefore, the mixed integer optimization subsystem 14*a*, among other things, solves a linear mixed integer programming problem (i.e., a Formulation Minimize-Sensors process to be described below) to compute the minimum number of sensors and their locations to obtain a virtual tripwire. The problem may be expressed in highly simplified form as forming a line running from begin node to end node and enclosed within the viewsheds 42*a* of sensors 42. In this regard, assume the following definitions:

a viewshed 42*a* is the maximum predefined area that a given sensor may potentially cover. One possible interpretation of a given viewshed 42*a* is points on the terrain that have a line-of-sight path to its associated sensor 42; and a "wedge" (w) (e.g., wedge 42$a_4$ in FIG. 4) is a connected component of a viewshed, or put differently, a wedge defines a set of connected points in a viewshed.

Furthermore, consider the following:

Let $S_i$ be a binary variable, 1 if i-th sensor location is selected, 0—otherwise;

Consider nodes corresponding to wedges, and arcs corresponding to spatial adjacency between pairs of wedges;

Let $f_{ij}$ be a non-negative real variable corresponding to flow along the arc from node i to j.

The "Formulation Minimize-Sensors" process below can be used to compute the virtual tripwire with a minimum number of sensors:

$$\min \sum s_i$$

$$\text{s.t.} \sum_k \sum_{incoming} f_{jk} \leq wedgeCount_i * s_i \ \forall \text{ sensors}$$

$$\sum_{incoming} f_{jk} = \sum_{outgoing} f_{kl} \ \forall \text{ graph nodes}$$

$$\sum f_{ij} = 1.0 \text{ for source and sink nodes}$$

$$f_{ij} \geq 0.0 \; \forall \text{ non source \& sink}$$

$$f_{ij} \in \Re, s_i \in \{0, 1\}$$

The above formulation computes a flow through the wedge adjacency graph in a manner that ensures a flow originating at the start node and terminating at the end node. If the flow passes through a wedge, the sensor corresponding to it is selected as being part of the eventual solution. Of all possible paths for the flow through the graph, the one that minimizes the count of selected sensors is chosen.

Figure 9A:
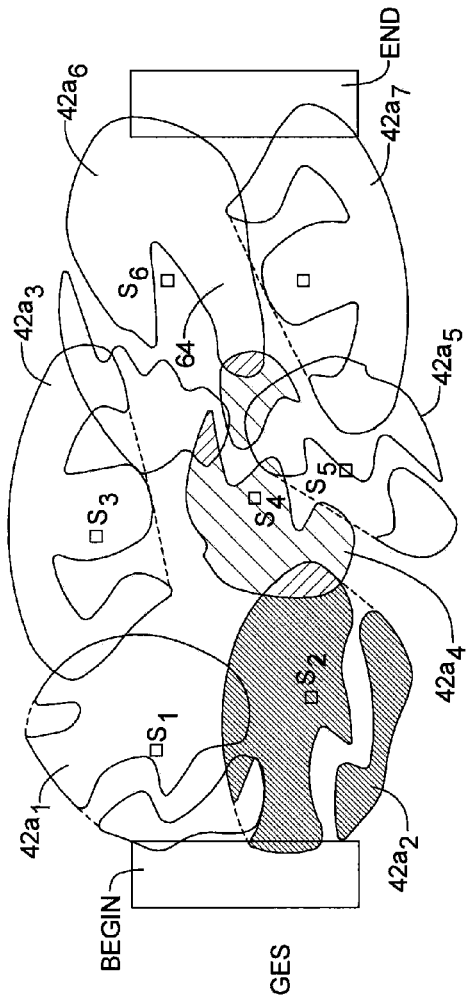
Figure 9B:
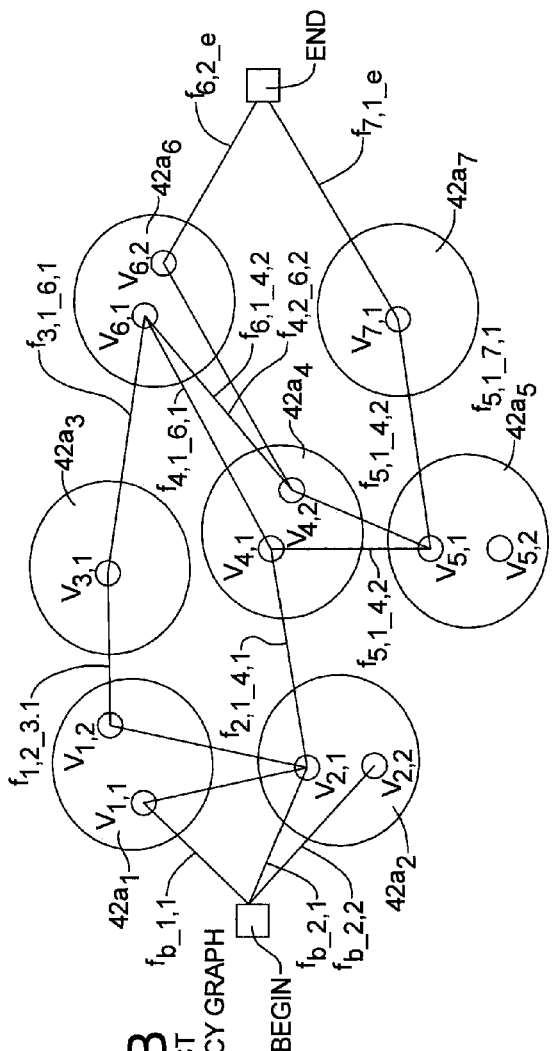

FIGS. 9A-9D show an illustrative example of the 'Formulation Minimize-Sensors' process with 7 potential sensors that have viewsheds $42a_1$-$42a_7$. The viewsheds are $42a_1$-$42a_7$ dissected into their contiguous subsets referred to as 'wedges', as indicated in FIG. 9A. At operation 2, (FIG. 9B) adjacency is determined for each pair of wedges. In the initial approach, adjacency is defined to exist between a pair of wedges if they possess non-zero overlap. The flow variables $f_{i,j}$ and $f_{j,i}$ are created for any pair of overlapping wedges. Flow variables are also created for any wedge that overlaps the begin area or the end area. The constraints in the Formulation Minimize-Sensors process are constructed such that non-zero flow through a wedge turns on the variable corresponding to its sensor. Otherwise the sensor variable is turned off. At operation 3 (FIG. 9C), the formulation is then solved to acquire the path through the network that minimizes the number of sensors. In operation 4 (FIG. 9D) a graphical tripwire, running from beginning to end, through only visible points is generated by this solution. One such tripwire may be calculated and shown to the user on the graphics display 62 portion of the display 24 and may be output to a data file.

The objective in the above is a count of the selected sensors. The optimization process seeks a solution with a minimum sensor count subject to a set of conditions. The first condition ensures that a sensor is part of the selected set if there is flow through any of its wedges. The second constraint ensures that flow is conserved through a node. The third constraint applies to the start node and the end node ensuring that the quantity of net outgoing flow from the start node is one unit; likewise the quantity of net incoming flow at the end node is also constrained to be one unit. The fourth constraint ensures that the flow is non-negative, to prevent flow in a backward direction along a directed arc. And finally, the last constraint constrains the flow variables to take on non-integer values, while the sensor variables are constrained to take on the binary values of 0 or 1.

Mixed integer optimization subsystem 14a optionally solves the next formulation to compute sensor placements that produce a virtual tripwire and maximize the area covered by "K" (user defined) number of sensor viewsheds. The Formulation Maximize-Area process is performed by extending the Formulation Minimize-Sensors process using the following added definitions:

Let R represent a subset of the viewshed. In a subset of the viewshed 42a, every point in R is covered by the same subset of sensor set 42. For example, note that viewshed 42a in FIG. 4A contains three viewshed subsets: $R_1$ covered by only sensor S1, $R_2$ covered by only sensor S2, and $R_3$ covered by the both S1 and S2, i.e. covered by the subset {S1, S2}.

Let $r_k$, define a binary variable representing the k-th viewshed subset $R_k$. Such a viewshed subset may be as small as a single pixel. The variable $r_k$ is defined to take on the value of 1 if the k-th viewshed subset is selected during the optimization; 0 if it is not.

Let $S_i^k$ be members of the subset of sensor set 42 that cover points in the k-th viewshed subset The following major operations may be performed:
perform an initial computation to compute viewshed subsets $r_k$ (which could be sampled pixels);
construct the wedge adjacency graph;
construct an optimization problem using the Formulation Maximize-Area process as follows:

$$\max \sum A_k r_k$$

s.t.

$$\sum_i S_i^k \geq r_k \; \forall \, k$$

$$\sum S_i = K$$

$$\sum_k \sum_{incoming} f_{jk} \leq wedgeCount_i \cdot S_i \; \forall \, S_i$$

$$\sum_{incoming} f_{jk} = \sum_{outgoing} f_{kl} \; \forall \text{ graph nodes}$$

$$\sum f_{jk} = 1.0 \text{ for source and destination}$$

$$f_{ij} \geq 0.0 \; \forall \text{ non source, destination nodes}$$

$$f_{jk} \Re; S_i, r_k \in \{0, 1\}$$

The above uses as an objective function the total area covered by selected viewshed subsets. A solution to the unknown quantities, namely sensor selections, flow variables and viewshed subset selections are sought by maximizing the objective function subject to a set of constraints. The first constraint ensures that if a viewshed subset $r_k$ is selected, i.e. $r_k=1$, at least one of the sensors covering that viewshed subset, i.e. at east one of $S_i^k$, is selected. The second constraint above ensures that only K number of sensors are selected. The rest of the operations are identical to those in the Formulation Minimize-Sensors process described above and serve the exact same purpose.

Figure 9F:
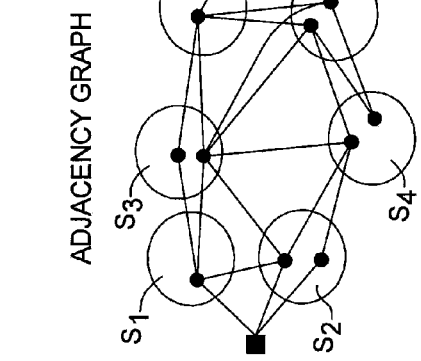
FIG. 9F illustrates an adjacency graph corresponding to the viewsheds shown in FIG. 9E; the tripwires that may be formed between the beginning and ending blocks using different combinations of the viewsheds.
Figure 9E:
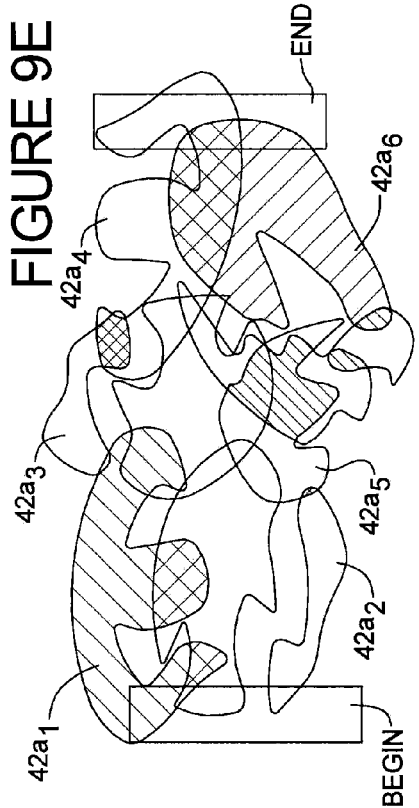
FIG. 9E illustrates another arrangement of partially overlapping viewsheds.
Figure 9H:
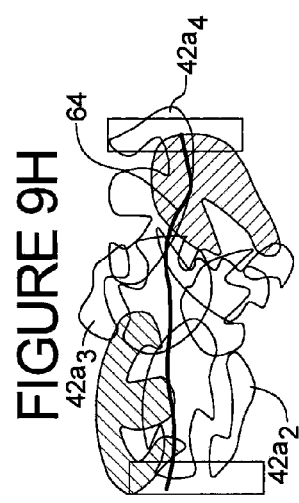
FIGS. 9G-9K show five different tripwire solutions, each involving three sensors.
Figure 9G:
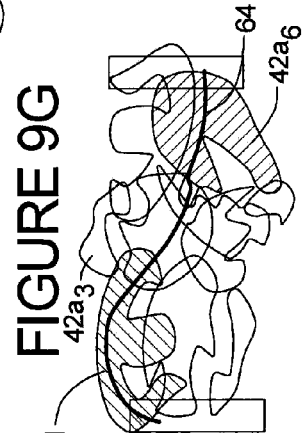
Figure 9K:
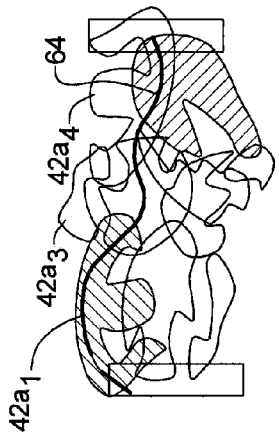
Figure 9J:
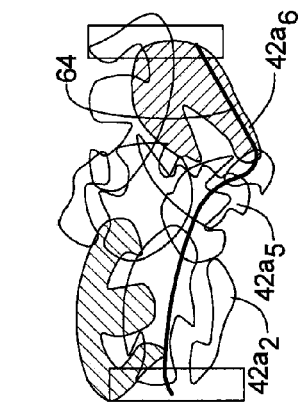
Figure 9I:
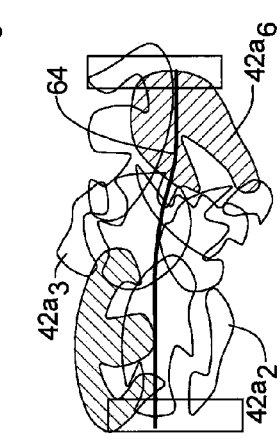

Alternate solutions are possible to the "Formulation Minimize-Sensors" process. FIG. 9E shows an example consisting of six candidate sensors. FIG. 9F depicts the wedge adjacency graph for this example. FIGS. 9G-9K show five different tripwire solutions, each involving three sensors.

Figure 9L:
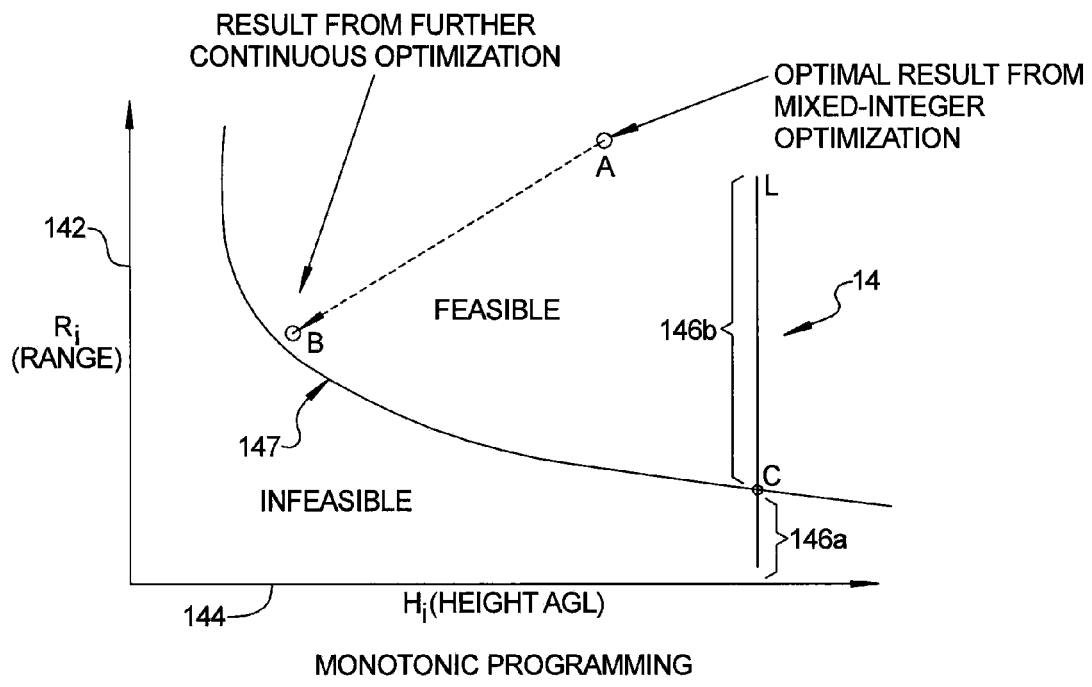
FIG. 9L is a graph illustrating the result of the operation of the continuous optimization subsystem of the present disclosure.

Finally, with reference to FIG. 9L, continuous optimization subsystem 14b solves the continuous optimization problem of fine tuning sensor ranges and heights. This is accomplished by executing a "Formulation Minimize-Range-and-Height" process that minimizes the ranges and heights of the sensors locations that were computed using the mixed integer optimization subsystem 14a. In describing the Formulation Minimize-Range-and-Height" process, the following definitions are added:

$R_i$ is defined as the range of the i-th sensor. $R_i$ takes on real values. Changing $R_i$ implies a change to the type of sensor that is being used;

$H_i$ is defined as the height above ground level at which the i-th sensor is placed;

$C_i$ is a user defined constant that defines the cost coefficient associated with the range of the i-th sensor;

$D_i$ is a user defined constant that defines the cost coefficient associated with the height of the i-th sensor;

α is a user defined constant that defines the desired fraction of coverage as obtained from the sensors selected by optimization subsystem 14a; "a" is between 0.0 and 1.0, and is often chosen to be 1.0

The Formulation Minimize-Range-and-Height process is set forth as follows:

$$\min \sum (C_i R_i + D_i H_i)$$

s.t. coverage ≥ α coverage(Mixed-Integer solution)

$$R_i, H_i \geq 0.0$$

$$R_i, H_i \in \Re$$

Inputs to the Formulation Minimize-Range-and-Height process include the sensor locations, the virtual tripwire and the coverage area computed by mixed integer optimization subsystem 14a. The optimization process above keeps the latitude and longitude locations of the sensors constant; it modifies only their ranges and heights. In effect, it minimizes the cost function defined in the objective ensuring that the coverage area, as computed in 14b using the viewsheds, stays above a defined fraction α of the input coverage area obtained from the mixed integer optimization subsystem 14a. The above formulation can be solved using a variety of continuous optimization techniques such as Gradient Line Search, Genetic Algorithms, Branch and Bound, etc.

FIG. 9L shows a graph 140 depicting the result of the optimization process. The graph show two axes 142 and 144. Axis 142 is for values of the i-th sensor's range and axis 144 is for the i-th sensor's height. A point on the graph 140 represents a particular solution for the i-th sensor's range and height. For n sensors, the set of n possible heights and n ranges can be represented by a 2n dimensional space. Back to the two dimensional space of the i-th sensor, consider a vertical line L on the graph, which defines a set of solutions all of which have a fixed height value, but differing range values. Some of these solutions (along portion 146a) are infeasible, while others (along portion 146b) are feasible. A feasible solution is one which meets the requirements of the constraints specified in the Formulation Minimize-Range-and-Height" process described above. The boundary between feasible and infeasible solutions on line L is defined by the curve 147.

The objective function in the Formulation Minimize-Range-and-Heights process can be considered to be a weighted sum of two separate objectives: one being the sensor ranges, the other the sensor heights. For differing relative weights, as defined by $C_i$ and $D_i$, different optimal solutions result. The curve 147 in FIG. 9L represents the set of all of such optimal solutions. Continuous optimization subsystem 14b may compute the curve 147, which is referred to as a "pareto front". The point A on the graph depicts an example of a solution obtained by solving the mixed-integer optimization subsystem 14a. The continuous optimization subsystem 14b works to move point A to point B, in other words to a location close to or on the pareto front, while still within the realm of feasible solutions. This movement represents a reduction in the cost of the solution because the height of the i-th sensor is minimized while still providing the i-th sensor with the minimum needed range. Continuous optimization subsystem 14b simultaneously minimizes the range and height of all input sensors.

Figure 6A:
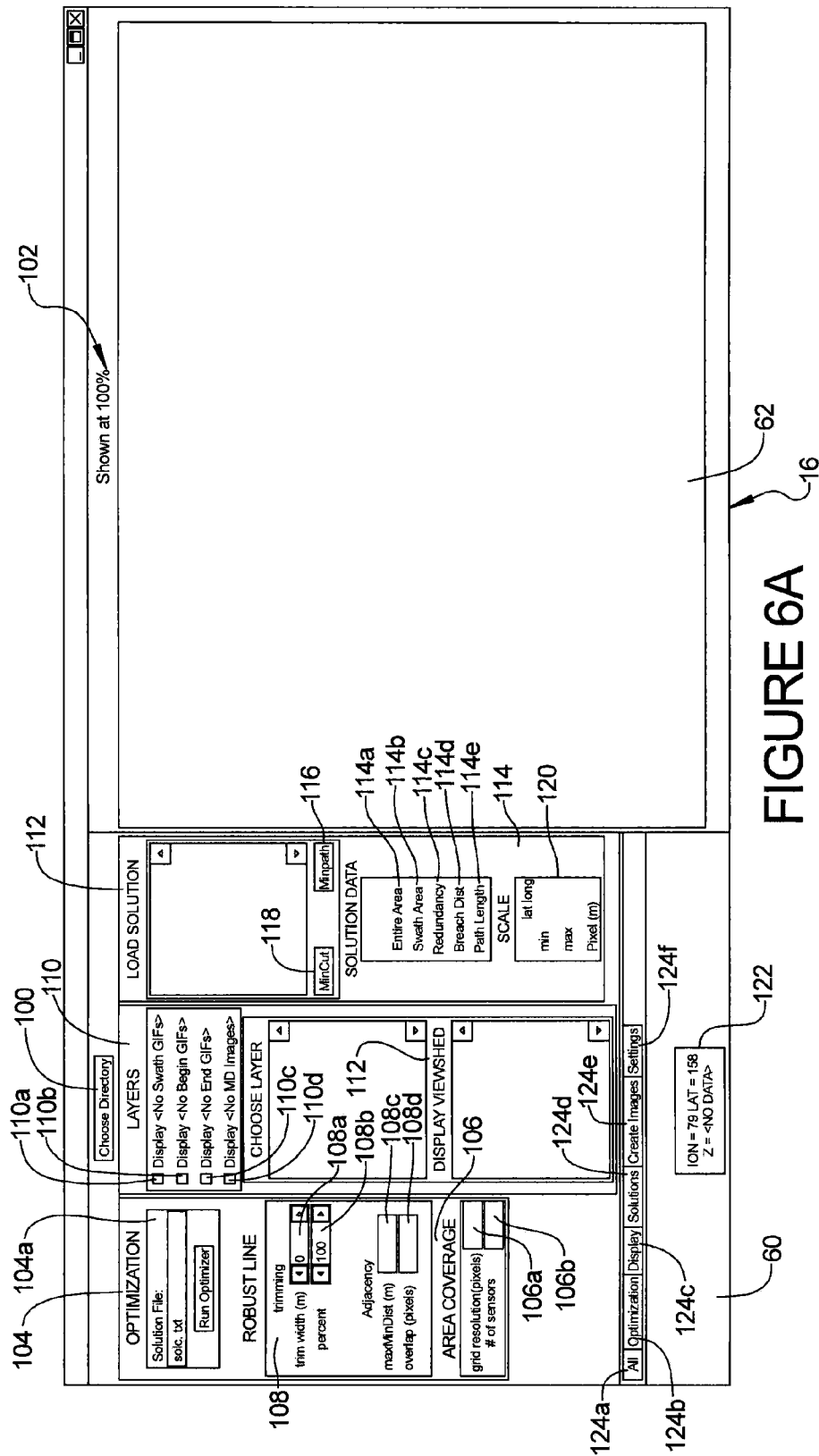
FIGS. 6A and 6B illustrate screens of an exemplary user interface that may be used to allow the user to input various selections to control the optimization process.

Referring to FIG. 6A, an exemplary computer screen display is shown in which a portion 60 of the screen provides for the various user inputs that may be selected in forming the virtual tripwire, and a portion 62 of the display displays the graphical entities. A further description of the various input options provided by the system 10 will be provided. As explained hereinbefore, the system 10 may be implemented via a software module that provides a user interface with one or more screens for enabling the input and modification of various parameters used by the system 10. In FIG. 6A, the portion 60 of the display forms the user interface, and will be referred to as the "interface 60". Portion 60 includes an option 100 for "Choose Directory", which initiates the loading and processing of a working directory for the optimization system 14. This working directory contains file-based inputs to the optimization system 14. These may include: a file defining locations of all candidate sensors, viewsheds of all candidate sensors, a begin viewshed, an end viewshed, an area patch defining the area of interest, and optionally an image of the terrain for use as a backdrop in the display portion 62. Output files from optimization system 14 are also saved in this directory. Outputs may include: a list of chosen sensors with their optimized heights, the shape and location of the tripwire, and optionally the shape and location of the crosser path having minimum observation 68 (as shown in FIG. 6). A "Resolution Label" 102 shows the scale at which images are being loaded and shown.

With further regard to FIG. 6A, an "Optimization" frame 104 having a "Run Optimizer" button 104b runs the optimization routine defined by the user selected options currently selected on the interface 60, once the Run Optimizer button 104b is pressed. The solution file name input into the "SolutionFile" field 104a provides a name to the optimization routine that is has been selected. When the "run Optimizer" button 104b is pressed, the optimization defined by the selected settings on the screen shown in FIG. 6A proceeds. If a previous optimization was run with the same viewshed processing options, no viewshed processing is done, otherwise processing shown in operations 1 and 2 of FIGS. 8A and 8B proceeds. Viewsheds are broken into wedges. The adjacently graph of these wedges is determined. Next an LPT file is written. This file may be processed by a solver of mixed integer programming (MIP) problems. GLPK and Coin-OR are examples of two such solvers that may be used. On completion, the solver produces an output file. Once the output file is available, the file is read to determine one of four outcomes: 1) the problem is infeasible; 2) the solver time out without a feasible solution; 3) the solver timed out with a feasible solution; or 4) the solver found the best solution before the time limit expired. The results are then conveyed to the user with a message box. If the result was 3) or 4) above, the viewsheds from the solution are listed in the "DISPLAY VIEWSHEDS" box 112, the solution is added to the "LOAD SOLUTION" displayed viewsheds box 111, and the solution file is saved to the working directory. The result of the optimization operations will be saved in the working directory with the name given in the text input box 104a.

Input 106 supports the Formulation Maximize-Area process. It provides a grid resolution input field 106a and an input field 106b for a user selected number of sensors 42. If the grid resolution is assigned the value of 1, the area maximization is performed with the resolution at which the problem was loaded. However, this may create an extremely large linear mixed-integer programming problem to solve, i.e. an extremely large number of viewshed subsets $r_k$. For this reason, the user has the option to solve the Formulation Maximize-Area process at a lower resolution. Entering "1" in field 106a runs the optimization at full (i.e., maximum) resolution. Entering a "3" will lead to an optimization where every third pixel on the display (vertically and horizontally) will be represented in the area coverage calculation. The input field 106b for the number of sensors allows the user to select a specific number of sensors 42a for forming the virtual tripwire. However, the objective function in the area formulation is the maximization of area. So the number of sensors actually acts as a constraint. The virtual tripwire constraints are still present, so if "K1" is the number of sensors arrived at after solving Formulation Minimize-Sensors, then an area maximization would need at least "K1" sensors, but could of course have more. Leaving the fields 106a and 106b blank will cause the system 10 to solve the Formulation Minimize-Sensors process, that is, the system 10 will determine the virtual tripwire with the minimum number of sensors. Placing entries in the fields 106a and 106b will cause the system 10 to perform its optimization operations to construct a tripwire having the maximum area of the viewsheds within the area of interest. However, altering the values placed in fields 106a and 106b has no effect until the optimization process is actually run.

Referring further to FIG. 6A, a "Robust Line" subsection 108 allows modifications to be made to the viewsheds 42a and the definition of "adjacency" in constructing the wedge adjacency graph prior to either form of optimization (i.e., minimum number of sensors or maximum area coverage by the viewsheds) being performed. These modifications are preferably done prior to the writing of either linear mixed integer programming problem and effect the two optimizations in exactly the same way. "Trimming", as mentioned earlier, is represented by a number "n", placed in the field 108a labeled "trim width (m)", and a positive percent "p", which is placed in field 108b labeled "percent". When a positive "n" is chosen, a trimmed viewshed is generated. A trimmed viewshed ("TV") is a subset of a viewshed ("V") where every pixel in the trimmed viewshed is the center of a circle of radius "n" of pixels, "p" percent of which are elements of the viewshed. This produces a trimmed viewshed smaller than the original. When a trimmed viewshed is used to construct the wedge adjacency graph, the solutions to either of the two optimization problems described earlier provide greater overlap between adjoining viewsheds. This produces a robust tripwire, i.e. a tripwire with a thickness implied by the user specified values of "n" and "p". This is shown in FIG. 6C, which shows an example of two adjacent viewsheds $42a_1$ and $42a_2$ that have an area of overlap 49. The overlap 49 represents a strong overlap in the top illustration of FIG. 6C. After positive trimming, which is shown in the middle illustration of FIG. 6C, and denoted by trimmed area number 49a, the overlap continues to exist, but is smaller as shown in the lower illustration of FIG. 6C. Thus, the smaller degree of overlap still allows for a continuous tripwire through the pair of viewsheds $42a_1$ and $42a_2$. In the top illustration of FIG. 6D, there is weak overlap between the two viewsheds $42a_1$ and $42a_2$, as indicated by overlap area 49. After positive trimming, as indicated by area 49a in the middle illustration of FIG. 6D, no overlap exists, as shown in the lower illustration of FIG. 6D. This breaks the tripwire through the viewsheds $42a_1$ and $42a_2$. Trimming so that "n" is a negative number reverses the definition of V and TV above so that the trimmed viewshed represents a viewshed larger than the original. Solutions to the two optimization problems in this case produce a "relaxed" virtual tripwire, that is a tripwire with gaps no more than the gap implied by the selection of "n" and "p".

The Adjacency "maxMinDist (m)" field 108c enables "adjacency" of two wedges to be defined as being adjacent only if the largest distance between two points in their overlap is at least "m" meters. Adjacency "overlap (pixels)", at field 108d, enables adjacency to be redefined so that two wedges are adjacent only if the number of overlapping pixels is at least the user input value.

Referring further to FIG. 6A, when a user sets up her/his working directory, they create several files that can be used as "layers". These files are loaded when the directory is chosen and are available in the selection boxes 110a-110d of section 110. Several variations of a particular type might be created and section 110 allows the user to switch which layer is currently being used. The selection boxes 110a-110d enable selection of one from several variations of a particular type. The specifically selected into the boxes 110a-110d toggle the display of those layers in the display portion 62.

Within section 110, box 110a relates to a "Swath", which means that the virtual tripwire and overlap are limited to the non-white area of the graphic being displayed. Viewsheds are trimmed to only contain pixels within the swath prior to adjacency calculation and optimization. Box 110b relates to "Begin", and is the definition of the pixels in which the tripwire can originate. Similar to the Swath, non-white pixels are considered "in" the "Begin", while white pixels are off limits. Box 110c relates to "End", and defines the pixels in which the virtual tripwire can terminate. Similar to Swath, non-white pixels are considered "in" the End, while white pixels are off limits. Box 110d relates to "MD Image", and allows selection of an image that is not used in the optimization process. It provides a backdrop for the overlays shown in the graphic. This image may be a screenshot of the terrain from the GIS 12. The "DISPLAY VIEWSHED" box 112 is used to select the viewshed from a list to display it on the overlay.

Referring further to FIG. 6A a "LOAD SOLUTION" box 111 allows the user to store several solutions with different parameter inputs and to reload them for comparison. These may comprise "begin" images and "end" images, swath images, viewshed images, digital terrain elevation data (Dted) images, and a position table. The position table may be a table containing names and geographic coordinates (along with other details) of sensors that make up the solutions, as well as 3D elevation data files, such as the digital elevation model (DEM) file and the DEM header file. The DEM file contains data defining a grid of elevations; the DEM header file defines meta data for the DEM, for example geographic coordinates of an anchor point, spacing between points on the grid, and number of points in the grid. A image size is determined based on the shape of the viewshed images and the maximum number of pixels set on the defaults tab of the interface. All images are loaded into a memory (not shown) of the system 10 and scaled to this size. Potential "begin", "swath", and Dted files are then listed in a "Choose Layer" box 113 and the first of each (alphabetically) is initially chosen and set in the "Layers" 110 box. The only processing of the viewsheds done at this point is to load them into Boolean arrays that account only for the smallest rectangle in the image that contains all of the non-white (out of view) pixels. The positions file, if present, is used to coordinate the viewsheds files to the latitude and longitude of the corresponding sensor. If any previous solutions are in the chosen directory, their filenames are listed in the "Load Solution" box 111. If any previous solutions are in the chosen directory, their filenames are listed in the "Load Solution" box 111. If the DEM header file is present it is used to establish the latitude and longitude range of the viewshed images, and the size of a pixel at the current resolution. These dimensions are then shown in the "Scale" section 120. If the grid float DEM is present, elevations are read from this file corresponding to each pixel at the current resolution.

With regard to the "Choose Layers" box 113, after loading a directory, "begin", "end", "swath" and Dted images can be chosen as the "current" image for the combined image at the right and (except for the Dted), the image relevant to the next optimization run. With regard to the "Layers" box 110, clicking any one of the check boxes 110a-110d forces a redraw of a combination of the following: all currently active viewsheds; the currently active "begin" image; the currently active "end" image; the currently active "swath" image; and the currently active "Dted" (i.e., backdrop) image. The "SOLUTION DATA" box 114 can be used to display results of analysis operations performed on the currently loaded solution. "Entire Area" selection 114a represents a percent coverage calculation for all the pixels in the region. Coverage means that at least one viewshed includes that pixel. The "Swath Area" selection 114b generates a percent coverage calculation for all the non-white pixels in the swath graphic. The "Redundancy" selection 114c is the percent of pixels in the union of the viewsheds that are covered by at least two viewsheds. The "Breach Distance" selection 114d provides the number of pixels (or corresponding distance) along the crosser path having minimum observation (68 in FIG. 6) that is covered by one or more of the selected sensors. This corresponds to the minimum thickness of the virtual tripwire. The "Path Length" selection 114e is the total length (in pixels or meters) of the virtual tripwire determined by the algorithm that computes the MinPath. "MinCut" 118 runs an algorithm that determines, relative to the currently loaded solution, the minimum number of covered pixels a path would have to traverse to travel from the southern edge to the northern edge. One such path is then shown on the interface. The current "begin" and "end" values are also relevant to this calculation. The result may be combined into the overlay. The number of pixels in view on this cut are converted into a distance measure and displayed as the "Breach Dist" diagnostic in 114d. "MinPath" 116 runs an algorithm that determines the minimum number of pixels, entirely within the current solution, that a path would need to traverse to travel from the begin pixels to the end pixels. One such path may then be shown on the display portion 62. The result may be combined into the overlay and written to a data file. The number of pixels in the path is converted into a distance measure and displayed as the "Path Length" under the "SOLUTION DATA" box 114. Because the virtual tripwire may be non-unique, it may be noted that the "Path Length" diagnostic is the minimal length of all tripwires.

The "SCALE" box 120 in FIG. 6A uses data from the digital elevation model to state the extremes and dimensions of the terrain loaded The region is rectangular in geographic coordinates. The "min" row displays the geographic coordinates, i.e. latitude and longitude, of the lower left corner of the rectangle; the "max" row displays the geographic coordinates of the upper right corner. "Pixel(m)" displays the size in meters of each pixel of the loaded graphic of the region. The "MESSAGES" box 122 displays messages from the optimization progress. Also, running a user input device such as a mouse over the display portion 62 may cause the latitude and longitude text in 122 to display the coordinates of the current mouse position.

Referring further to FIG. 6A, the Tabs 124a-124f at the lower left corner of portion the screen provides several options. Selecting the "All" tab 124a shows the first three columns of inputs (i.e., all of the inputs under the "OPTIMIZATION", "LAYERS" and "LOAD SOLUTION" headings). Selecting "Optimization" tab 124b shows the first column of inputs (i.e., under the "OPTIMIZATION" heading). Selecting the "Display" tab 124c shows the second column of inputs (i.e., under "LAYERS"). Selecting the "Solutions" tab 124d shows the third column of inputs under "LOAD SOLUTION". Selecting the "Create Images" tab 124e is an option selection that shows a set of commands that may be used to create the "begin" and "end" files. Selecting the "Settings" tab 124f causes another screen shown in FIG. 6B to be displayed, where additional inputs are provided for further optimization parameters to be input.

Figure 6B:
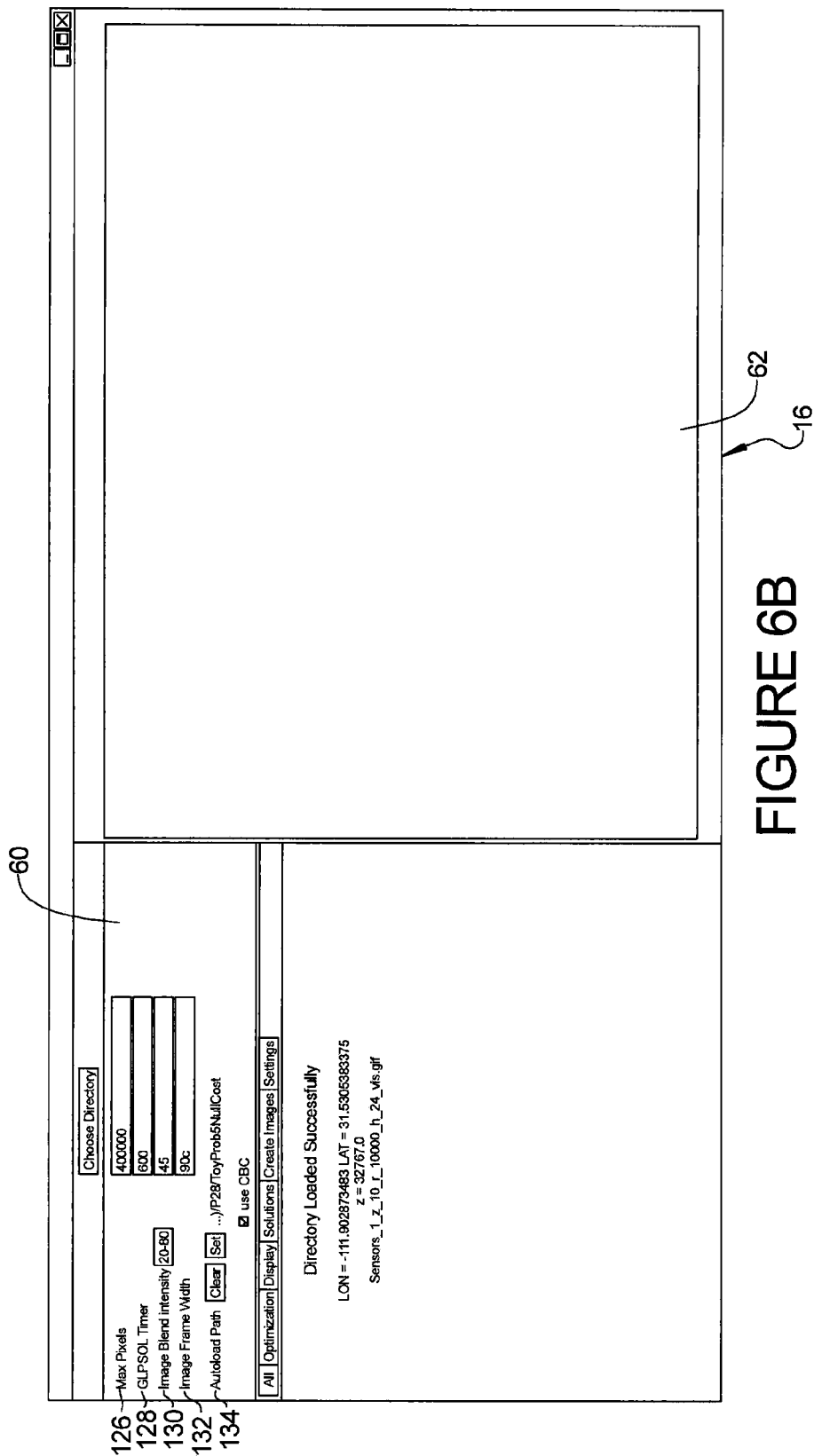
Figure 6C:
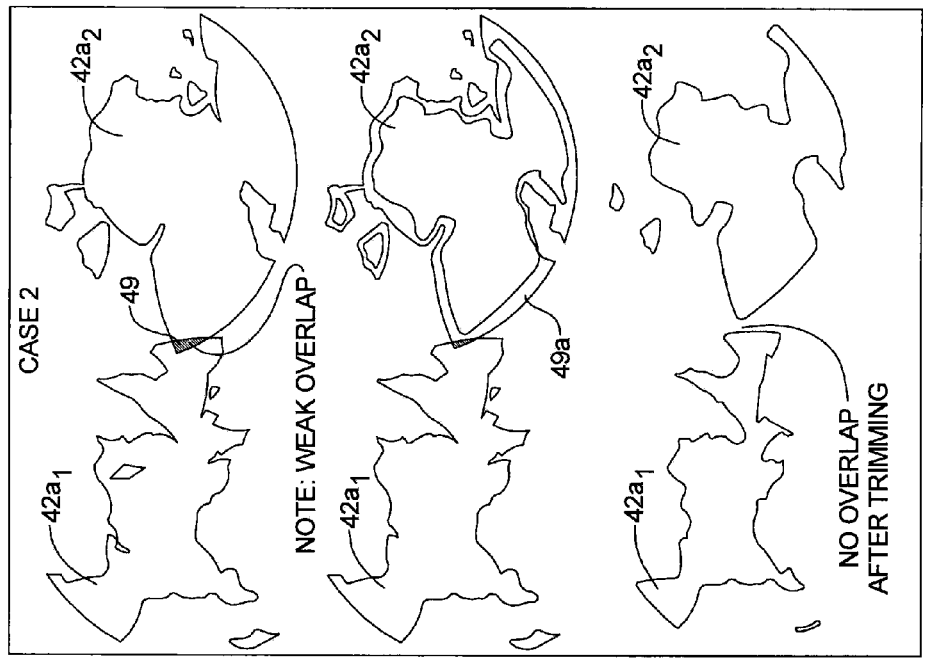
FIGS. 6C and 6D provide examples of trimming that produce a smaller degree of overlap between wedges of adjacent viewsheds (FIG. 6C) and a small gap between the wedges of adjacent viewsheds (FIG. 6D).
Figure 6D:
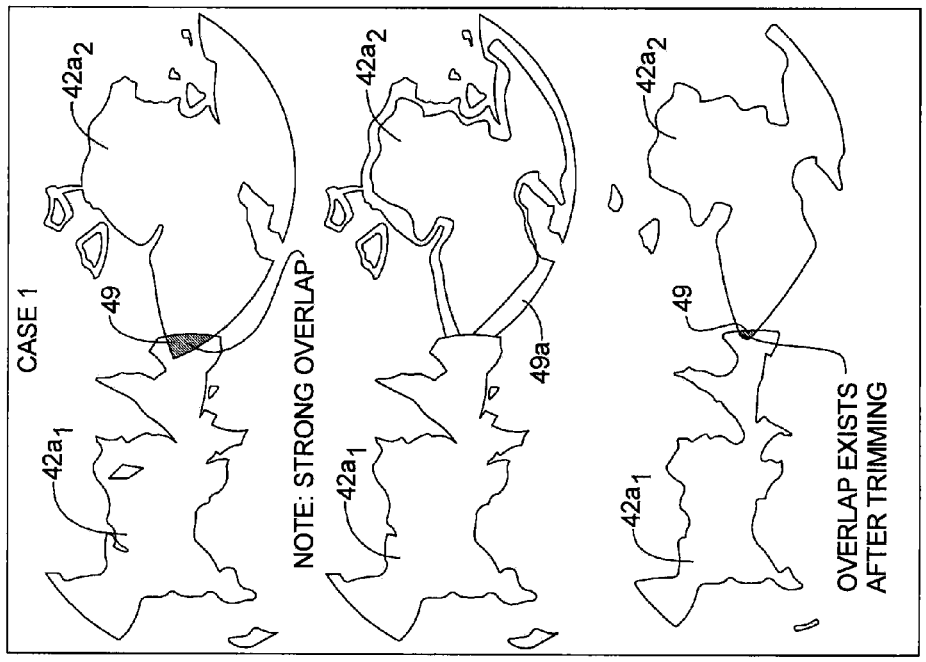

In FIG. 6B shows other optimization parameters that may be accessed from the screen shown. The "Max Pixels" field 126 allows for down-scaling of all loaded images. The "GLPSOL Time" selection 128 establishes a maximum execution time allowed by the user to solve the optimization problem. "Image Blend Intensity" 130 allows the backdrop image (MD image) to have more or less intensity in the overlay. The "Image Frame Width" selection 132 sets the width (and height) of the interface's image frame 62. Lower resolution display monitors may need the ability to decrease the size of this graphical user interface element. The "Autoload Path (Clear/Set)" field 132 sets a path to an optimization system 14 working directory that will load automatically when the optimization system 14 is started.

When using the system 10, and with further reference for example to FIG. 6A, positioning a device such as a mouse, which may form a portion of the user interface 60, over an overlay displayed on the display portion 62 will calculate the latitude and longitude corresponding to the current position of the mouse. Those coordinates will be shown in the message box at the bottom of the interface. If the Grid Float DEM is present, the elevation at this point may also be displayed in the message box 122. Clicking the mouse while the mouse is positioned over one of the points on the display portion 62 that represents a sensor will include or exclude that sensor from the current group of active sensors. This may add or remove it from the "DISPLAY VIEWSHED" box 112, update the Solution Data diagnostics and when the "Min Path" or "Min Cut" algorithm is run, this sensor may be included.

Figure 10:
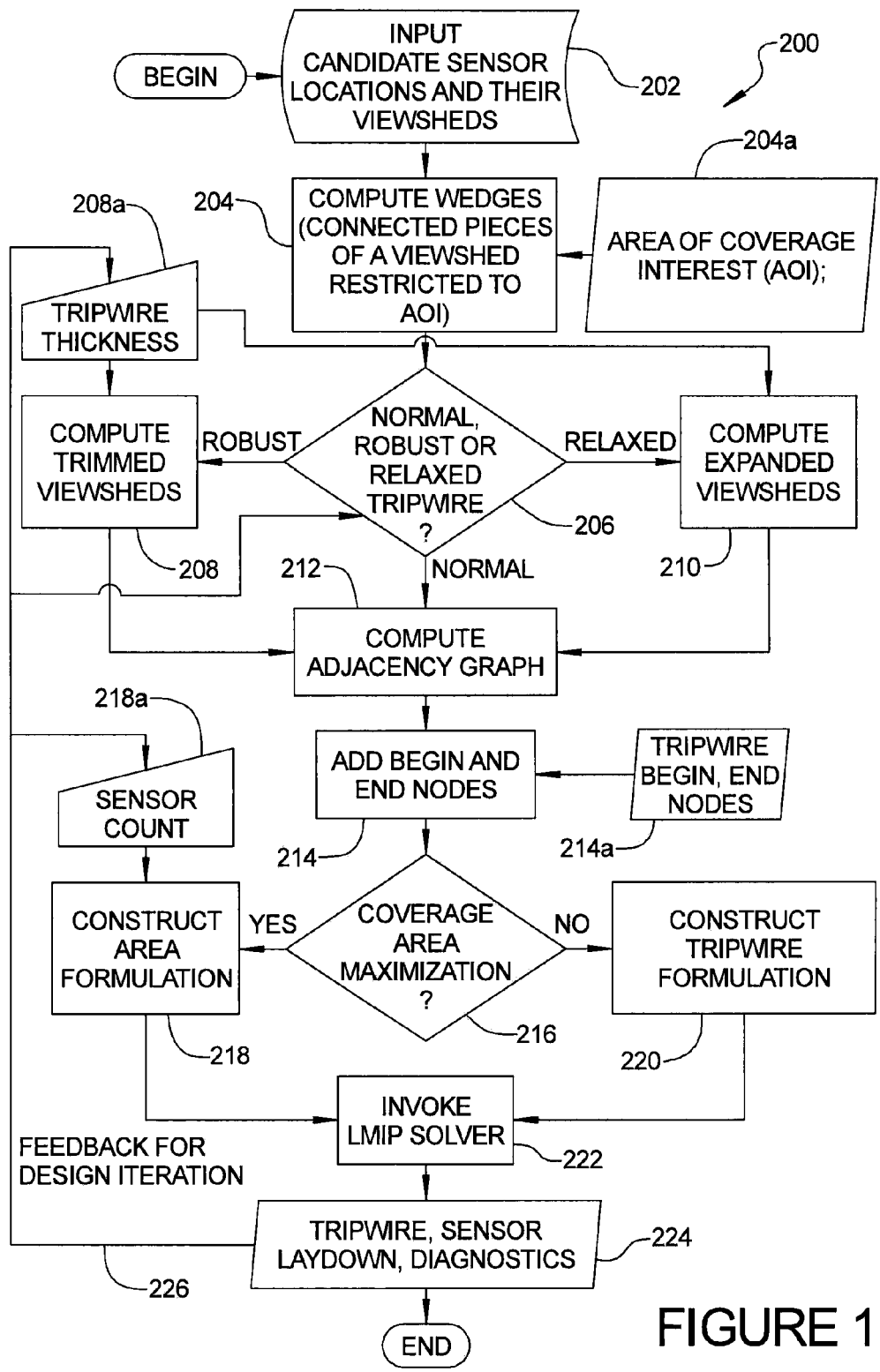
FIG. 10 is a flowchart illustrating major operations performed by one implementation of the system.

Referring now to FIG. 10, a flowchart 200 is shown of exemplary operations performed by one implementation of the system 10. Initially input 202 provides the locations of the entire quantity of candidate sensors 42, along with the viewshed 42a for each sensor. As explained previously, a default number of sensors may be programmed into the system 10 for the system to start its calculations with, for example 800 sensors. Alternatively, the system 10 may provide for an input to allow a user to provide a desired number of sensors to start the calculation process with. In this example 800 sensors 42 would be a number that is expected to be ample for forming a virtual tripwire through the area of interest. However this number could be 20, 50, 100, 10,000 or any other number, which is expected to be ample for the area of interest.

At operation 204 the optimization subsystem 14 analyzes each viewshed 42a and determines the wedges that make up each viewshed within the area of interest. Operation 204 may make use of area of interest information and area of tripwire restriction provided at operation 204a for performing the analysis and computations in operation 204.

At operation 206 an inquiry may be made as to whether a "Normal", "Robust" or "Relaxed" virtual tripwire may be formed. For example, a normal tripwire may be comprised of a number of viewsheds 42a that form a continuous, unbroken line through the area of interest. A "robust" tripwire may be a virtual tripwire that has a relatively large minimum thickness over its entire length, maybe 1 Km. A "relaxed" tripwire may be a virtual tripwire formed having a number of viewsheds that allow gaps of a specified maximum distance (e.g., 1 Km) between any two adjacent viewsheds.

If a robust tripwire is to be formed, then the trimmed viewsheds (TV) may be computed at operation 208 using a user specified thickness as an input from input 208a. If a relaxed tripwire is to be formed, then trimmed viewsheds with a negative trim width at operation 210 are used (e.g., to provide a maximum gap of 1 Km).

At operation 212 the mixed-integer optimization subsystem 14a may compute a wedge adjacency graph as explained earlier. At operation 214 the begin and end nodes that are input by the user at operation 214a are added to the wedge adjacency graph. These nodes are the nodes that are assigned to the user designated start patch 80 and user designated end patch 82 discussed in connection with FIG. 8.

At operation 216 an inquiry is made if the coverage area of the selected sensors 42 resulting from viewsheds 42a is to be maximized. If so, then the number of sensors used in the previous determination is again obtained, at user input 218a, and the Formulation Maximize-Area process is constructed at operation 218. If the inquiry at operation 216 produces a "No" answer, then operation 220 the uses Formulation Minimize-Sensors process. At operation 222 linear mixed integer program (LMIP) solvers are invoked on the problems constructed above to perform the computations needed to solve the problem. At operation 224, the actual virtual tripwire is laid out over the area of interest. At this operation the sensor locations may also be laid out (i.e., overlayed) on the displayed area of interest together with the viewsheds of each sensor. The user may optionally perform additional analysis on the solution obtained. The user may determine that another tripwire design iteration is to be performed using a different tripwire thickness, as indicated by loop back line 226.

The system 10 and methodology of the present disclosure thus enables large geographic areas to be monitored with a minimum number of sensors in accordance with user input parameters. The system 10 is able to construct a virtual tripwire through a designated region of interest with a minimum number of sensors needed to achieve either an uninterrupted path, or with a path having user designated maximum length gaps spaced therealong. The system 10 advantageously considers the topography that exists within the region of interest and is able to construct a virtual tripwire that most cost effectively determines the placements for the desired number of sensors to form the virtual tripwire. Various user inputs allow flexibility in the tripwire construction process so that the thickness of the tripwire, as well as maximizing the area of coverage of the viewsheds through which the tripwire extends, can be accomplished.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus for enabling a user to generate a virtual tripwire through a geographic area of interest using a plurality of sensors, the apparatus comprising:
    a software module adapted to run on a processor and configured to receive:
        an input for allowing a user to input a digital elevation model (DEM) of the area of interest; and
        an input responsive to a user controlled device for defining a swath of the area of interest, the swath representing a subregion laying over, or adjacent to, a border to be monitored; and
    a display for receiving information output from the software module and displaying computed locations of a plurality of independent sensors used to form the virtual tripwire through the swath of the area of interest in a manner that minimizes the number of sensors selected to form the virtual tripwire.

2. The apparatus of claim 1, further comprising a sensor number input field for enabling the user to input a number of sensors to be used by the apparatus in determining the locations of the sensors needed to form the virtual tripwire.

3. The apparatus of claim 1, further comprising inputs that enable the user to define a start location and an end location for the virtual tripwire.

4. The apparatus of claim 1, wherein the apparatus displays the sensors as an overlay on the DEM with the sensors at their computed locations.

5. The apparatus of claim 1, further comprising an input for enabling the user to increase and decrease a thickness of the virtual tripwire, the thickness representing a distance at any point along the virtual tripwire in which a person or object crossing the virtual tripwire will be detected.

6. The apparatus of claim 1, wherein the apparatus further displays a viewshed of each of said sensors on the generated display, the viewsheds representing a line-of-sight coverage region of each of the sensors used to form the virtual tripwire, and each said viewshed being overlayed over its respective said sensor.

7. The apparatus of claim 6, wherein the viewsheds are overlayed on the DEM.

8. The apparatus of claim 6, wherein each said viewshed comprises a plurality of wedges made up of at least one pixel, with each said wedge defining an area where a line-of-sight exists to its respective said sensor.

9. The apparatus of claim 8, further comprising an input for enabling a user to define a minimum distance of overlap between any two specific ones of the wedges before the two specific ones of the wedges can be defined as being adjacent, for purposes of using the their respective viewsheds to define virtual tripwire.

10. The apparatus of claim 8, further comprising an input for enabling a user to define a minimum number of pixels that are required to overlap between two said wedges of two different said viewsheds, before the two said wedges can be defined as being adjacent for the purpose of using their respective viewsheds to define the virtual tripwire.

11. The apparatus of claim 6, further comprising a user input for enabling the user to define a resolution of a display grid on which the DEM and the virtual trip wire are being displayed.

12. The apparatus of claim 1, further comprising a user input field for enabling a user to define a breach distance between two adjacent sensors forming the virtual tripwire, the breach distance representing a gap between a coverage region of said two adjacent sensors where the virtual tripwire is discontinuous.

13. The apparatus of claim 1, further comprising an input for enabling the user to define latitude and longitude coordinates of at least one element present within the area of interest, where the element comprises at least one of:
    a bridge;
    a road;
    an antenna tower;
    a power line pole;
    a dam; and
    a water tower.

14. The apparatus of claim 3, wherein the display is formed by a plurality of pixels, and wherein the apparatus includes a MinPath input to determine a minimum number of pixels that the virtual tripwire requires to extend from the start location to the end location.

15. An apparatus for enabling a user to generate a virtual tripwire through a geographic area of interest using a plurality of sensors to detect the presence of an object or individual that crosses the virtual tripwire, the apparatus comprising:
- a software module configured to run on a processor for receiving:
  - an input for allowing a user to input a digital elevation model (DEM) of the area of interest; and
  - an input for enabling the user to define a plurality of candidate sensors that represents a maximum number of sensors that may be used to form the virtual tripwire;
- a display in communication with the processor to receive an output from the software module, the output including information used by the display for illustrating the virtual tripwire on the display, the output further enabling the display to illustrate:
  - computed locations of at least a subplurality of the candidate sensors used to form the virtual tripwire through the area of interest;
  - a viewshed of each one of the subplurality of the candidate sensors used to form the virtual tripwire, each said viewshed representing a coverage region of its associated said candidate sensor and selected adjacent ones of the viewsheds of different ones of subplurality of the candidate sensors overlapping with one another; and
  - the display overlaying the viewsheds on the DEM while displaying the virtual tripwire.

16. The apparatus of claim 15, further comprising an input responsive to a user controlled device for enabling a user to define a swath of the area of interest, the swath representing a subregion of the area of interest in which the virtual tripwire is to be formed.

17. The apparatus of claim 15, wherein each said displayed viewshed includes a plurality of wedges forming independent subregions, with each said subregion having line-of-sight access to its associated said sensor; and the apparatus further including a user input enabling a user to define a minimum distance of overlap of two ones of the wedges of different ones of the candidate sensors before the two ones of the viewsheds are determined to be overlapping.

18. The apparatus of claim 15, further comprising an input enabling the user to define a desired minimum thickness of the virtual tripwire, the desired minimum thickness representing a distance generally perpendicular to the virtual tripwire within which one or more of the subplurality of candidate sensors is able to detect said object or individual.

19. An apparatus for enabling a user to generate a virtual tripwire through a geographic area of interest using a plurality of sensors to detect the presence of an object or individual that crosses the virtual tripwire, the apparatus comprising:
- a software module configured to receive:
  - an input for allowing a user to input a digital elevation model (DEM) of the area of interest;
  - an input for enabling the user to define a thickness of the virtual tripwire;
- a computing subsystem operatively associated with the software module for determining a minimum number of sensors, and a location of each one of said minimum number of sensors on the DEM, required to form the virtual tripwire with the user defined thickness;
- a display adapted to use information generated by the computing subsystem for illustrating the virtual tripwire as an overlay on the DEM.

20. The apparatus of claim 19, wherein the display is further adapted to display each one of said minimum number of sensors as an overlay on the DEM at its computed location.

21. The apparatus of claim 19, wherein the thickness of the virtual tripwire representing a distance generally perpendicular to the virtual tripwire at a given point therealong in which the object or individual is detected by at least one of the sensors as the individual or object crosses the virtual tripwire; and
wherein the computing subsystem considers said thickness of the virtual tripwire in determining the minimum number of sensors and the location of each one of the minimum number of sensors.

* * * * *